United States Patent
Cao et al.

(10) Patent No.: US 12,167,353 B2
(45) Date of Patent: Dec. 10, 2024

(54) NETWORK ENTITIES AND METHODS FOR A WIRELESS NETWORK SYSTEM FOR DETERMINING TIME INFORMATION

(71) Applicant: Huawei Technologies Co., Ltd., Shenzhen (CN)

(72) Inventors: Hanwen Cao, Munich (DE); Sandip Gangakhedkar, Munich (DE); Qing Wei, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 253 days.

(21) Appl. No.: 17/479,720

(22) Filed: Sep. 20, 2021

(65) Prior Publication Data

US 2022/0007321 A1 Jan. 6, 2022

Related U.S. Application Data

(63) Continuation of application No. PCT/EP2019/057131, filed on Mar. 21, 2019.

(51) Int. Cl.
*H04W 56/00* (2009.01)
*H04J 3/06* (2006.01)

(52) U.S. Cl.
CPC ....... *H04W 56/0015* (2013.01); *H04J 3/0667* (2013.01)

(58) Field of Classification Search
CPC .......................... H04W 56/0015; H04J 3/0667
See application file for complete search history.

(56) References Cited

U.S. PATENT DOCUMENTS 7,940,667 B1 5/2011 Coady et al.
8,326,319 B2 12/2012 Davis
(Continued)

FOREIGN PATENT DOCUMENTS

CN 102598556 A 7/2012
CN 109151929 A 1/2019
(Continued)

OTHER PUBLICATIONS

Magee, A., "Synchronization in Next-Generation Mobile Backhaul Networks", IEEE Communications Magazine Oct. 2010, 7 pages.
(Continued)

*Primary Examiner* — Ricky Q Ngo
*Assistant Examiner* — Stephen N Steiner
(74) *Attorney, Agent, or Firm* — Slater Matsil, LLP

(57) ABSTRACT

The present disclosure provides a network entity for a wireless network system. The network entity is configured to obtain an ingress time of a received packet, the ingress time indicating the time at which the packet enters the network system, determine time information regarding the packet based on the ingress time, and provide the time information to another network entity. A further network entity for a wireless network system is configured to obtain time information regarding a received packet from another network entity, and obtain an egress time of the packet, the egress time indicating a time at which the packet leaves the network system, based on the time information. This disclosure also relates to the network entities that are configured to synchronize an internal time valid at the network entities with an external time valid at an external network entity.

21 Claims, 22 Drawing Sheets

(56) References Cited

U.S. PATENT DOCUMENTS

| | | | |
|---|---|---|---|
| 2007/0147435 A1 | 6/2007 | Hamilton et al. | |
| 2009/0016258 A1* | 1/2009 | Zhang | H04W 76/12 |
| | | | 370/315 |
| 2015/0023325 A1 | 1/2015 | Wetterwalk et al. | |
| 2019/0045475 A1* | 2/2019 | Kasichainula | H04W 56/003 |
| 2020/0053678 A1* | 2/2020 | Moon | H04W 76/22 |

FOREIGN PATENT DOCUMENTS

| | | |
|---|---|---|
| WO | 2010002330 A1 | 1/2010 |
| WO | 2015003359 A1 | 1/2015 |

OTHER PUBLICATIONS

3GPP TS 23.501 V15.4.0 (Dec. 2018), 3rd Generation Partnership Project; Technical Specification Group Services and System Aspects; System Architecture for the 5G System; Stage 2 (Release 15), 236 pages.

3GPP TS 22.261 V16.6.0 (Dec. 2018), 3rd Generation Partnership Project; Technical Specification Group Services and System Aspects; Service requirements for the 5G system; Stage 1 (Release 16), 72 pages.

CATT, "PTP 1588 support in 5GS/TSN", 3GPP TSG-RAN WG2 Meeting #104, R2-1816360, Spokane, WA, US, Nov. 12-16, 2018, 6 pages.

3GPP TR 22.804 V16.2.0 (Dec. 2018), 3rd Generation Partnership Project; Technical Specification Group Services and System Aspects; Study on Communication for Automation in Vertical Domains (Release 16), 196 pages.

3GPP TR 22.862 V14.1.0 (Sep. 2016), 3rd Generation Partnership Project; Technical Specification Group Services and System Aspects; Feasibility Study on New Services and Markets Technology Enablers for Critical Communications; Stage 1 (Release 14), 31 pages.

3GPP TR 23.734 V16.0.0 (Dec. 2018), 3rd Generation Partnership Project; Technical Specification Group Services and System Aspects; Study on enhancement of 5GS for Vertical and LAN Services (Release 16), 107 pages.

Huawei et al. "Discussion on over-the-air time synchronization for URLLC", 3GPP TSG WG1 NR Ad Hoc Meeting, R1-1715415, Nagoya, Japan, Sep. 18-12, 2017, 3 pages.

Siemens AG et al., "cyberCAV—5G in Industrial Automation: Different and Multiple Time Domains for Synchronization", 3GPP TSG-SA WG1 Meeting #84, S1-183329, Spokane, WA, USA, Nov. 12-16, 2018, 8 pages.

Huawei et al., "Solution of Time Synchronization in Multiple TSN Clock Domains", SA WG2 Meeting #129bis, S2-1812413, West Palm Beach, Florida, US, Nov. 26-30, 2018, 11 pages.

IEEE P802.1AS-Rev/D7.3, Draft Standard for Local and Metropolitan Area Networks-Timing and Synchronization for Time-Sensitive Applications, Aug. 2, 2018, 502 pages.

Belliardi, R., "Use Cases IEC/IEEE 60802", V1.3, Sep. 13, 2018, 74 pages.

* cited by examiner

0011010... 10010 100100110...01001 0101 truncation of most significant digits truncation of least significant digits

FIG. 12

| PTP Message Header Format | | | | | | | | | Octets | Offset |
|---|---|---|---|---|---|---|---|---|---|---|
| Bits | | | | | | | | | | |
| 7 | 6 | 5 | 4 | 3 | 2 | 1 | 0 | | | |
| transportSpecific | | | | messageType | | | | 1 | 0 |
| Reserved | | | | versionPTP | | | | 1 | 1 |
| messageLength | | | | | | | | 2 | 2 |
| domainNumber | | | | | | | | 1 | 4 |
| Reserved | | | | | | | | 1 | 5 |
| Flags | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceID | | | | | | | | 2 | 30 |
| controlField | | | | | | | | 1 | 32 |
| logMessageInterval | | | | | | | | 1 | 33 |

FIG. 14

NETWORK ENTITIES AND METHODS FOR A WIRELESS NETWORK SYSTEM FOR DETERMINING TIME INFORMATION

CROSS-REFERENCE TO RELATED APPLICATIONS

This application is a continuation of International Application No. PCT/EP2019/057131, filed on Mar. 21, 2019, the disclosure of which is hereby incorporated by reference in its entirety.

TECHNICAL FIELD

The present disclosure relates generally to the field of wireless mobile communication, and, more particularly, determining time information in a cellular communication system for an external application with a precise timing requirement.

To this end, the present disclosure presents a network entity for determining time information and providing the time information to another network entity. This disclosure also presents a network entity that synchronizes an internal time valid at the network entity with an external time valid at an external network entity. Further, the present disclosure presents corresponding methods.

BACKGROUND

Precise time reference synchronization within multiple clock domains and deterministic data transmission over the 5G system (5GS) is desired by the applications in diverse vertical industries, such as smart factory, Program Making & Special Events (PMSE), autonomous driving and its underlying V2X communication, etc.

FIG. 22 schematically illustrates, in a smart factory scenario, working clock domain interactions including "Merge" 2201 and "Separate" 2202, according to the prior art. The interactions between the working clock domain are exemplarily discussed in 3GPP S1-183329: cyberCAV—5G in Industrial Automation: Different and Multiple Time Domains for Synchronization, Spokane, WA, USA, 12-16 Nov. 2018.

In conventional mobile communication systems, the synchronization is normally done by simple broadcasting of time information and there is no strict control of communication delay. As a result, the time synchronization bias and data transfer jitter becomes uncontrollable, which cannot meet the aforementioned requirements from diverse vertical industries.

SUMMARY

In view of the above-mentioned problems and disadvantages, embodiments of the present invention aim to improve the conventional devices and methods. Embodiments of the present invention have thereby the objective to provide network entities for a wireless network system (e.g., in a core network) and methods performed by the network entities. In some embodiments of the invention, the delay measurement and the jitter control may be provided, for example, in the cellular communication system.

An objective is achieved by the solution provided in the enclosed independent claims. Advantageous implementations of the present disclosure are further defined in the dependent claims.

Moreover, a further objective of embodiments of the present invention is to support multiple clock domains for a 5G System functioning as a time-aware relay and to achieve time-sensitive deterministic transmission with fixed delay/low jitter.

This may be achieved by an End-to-End (E2E) synchronization within the 5GS. The two ends of the 5GS may be for instance a User Plane Function (UPF) and a User Equipment (UE), or two UEs. Efficient delivery of ingress/egress timestamps may be used for measuring residence time (delay within 5GS) and/or for realizing adaptive buffering until fixed residence time before egress.

A first aspect of the disclosure provides a network entity for a wireless network system, wherein the network entity is configured to obtain an ingress time of a received packet, the ingress time indicating the time at which the packet enters the network system, determine time information regarding the packet based on the ingress time, and provide the time information to another network entity.

The network entity may be, for example, a network node, such as a User equipment (UE), or a User Plane Function (UPF). The UPF may also be a network node or it may be implemented as a function in a network node. The wireless network system may be a Long Term Evolution (LTE) network system, a fifth Generation (5G) network system, etc.

In some embodiments, the network entity may be in the core network, for example, the wireless network system may be the 5G network system and the network entity may be the UPF being in the core network of the 5G network system.

The network entity (e.g., the UE or the UPF) is configured to obtain the ingress time of a received packet. The received packet may be received from an entity or a node in an external network. The network entity (e.g., the UE or the UPF) may further determine the time information and provide the time information to another network entity which may be, for example, another UE or another UPF (e.g., being in the core network of the wireless network system).

In an implementation form of the first aspect, the time information includes the ingress time of the packet.

In a further implementation form of the first aspect, the network entity is further configured to calculate an egress time of the packet, the egress time indicating the time at which the packet leaves the network system, based on the ingress time and a predetermined residence time of the packet in the network system, wherein the time information includes the egress time.

In a further implementation form of the first aspect, the network entity is further configured to obtain a synchronization message associated with the packet, modify the synchronization message, in particular modify a correction field of the synchronization message, according to the predetermined residence time, and provide the modified synchronization message to the other network entity.

In a further implementation form of the first aspect, the network entity is further configured to determine if the packet belongs to a set of packets that enter the network system periodically, determine an interval, such as a time interval, if the packet belongs to such a set of packets, and provide information indicative of the periodicity to the other network entity, wherein the information indicative of the periodicity is based on the interval.

In an implementation, the time interval is indicative of the periodicity of the set of packets. Based on the knowledge of the time interval, the network entity can determine the egress time. As an example, the network entity determines the egress time of packets in the set of packets based on the egress time of a first packet of the set of packets and on the time interval. In particular, the network entity may add to the egress time of a packet the time interval to obtain the egress time of the next packet.

In a further implementation form of the first aspect, the network entity is further configured to incorporate the time information into a timestamp bit-format, and truncate the timestamp bit-format by removing at least one most significant bit and/or at least one least significant bit.

In a further implementation form of the first aspect, the network entity is further configured to provide the time information to the other network entity by at least one of:
concatenating the time information with the packet,
including the time information into a payload of the packet,
including the time information into a header of the packet,
generating a further packet including the time information,
using a control message to deliver the time information.

Moreover, in some embodiments, a first part of the time information (i.e. the time information after the truncation) may be carried in the data plane and second part of the time information (i.e. the truncated part of the time information) may be carried in the control plane.

A second aspect of the disclosure provides a network entity for a wireless network system, wherein the network entity is configured to obtain time information regarding a received packet from another network entity, and obtain an egress time of the packet, the egress time indicating a time at which the packet leaves the network system, based on the time information.

The network entity (i.e., of the second aspect) may be, for example, a UE or a UPF. The network entity is configured to obtain time information regarding the received packet from another network entity which may be, for example, an entity within the network system, in particular from another UE or UPF.

In an implementation form of the second aspect, the time information includes an ingress time of the packet, the ingress time indicating a time at which the packet enters the network system, and the network entity is configured to determine the egress time based on the ingress time.

In a further implementation form of the second aspect, the network entity is further configured to determine a residence time of the packet in the network system based on the ingress time and the egress time of the packet.

In a further implementation form of the second aspect, the network entity is further configured to determine the egress time of the packet based on the ingress time and a predetermined residence time of the packet in the network system.

In a further implementation form of the second aspect, the time information includes the egress time, and the network entity is configured to extract the egress time from the time information.

In a further implementation form of the second aspect, the network entity is further configured to obtain a predetermined residence time of the packet in the network system.

In a further implementation form of the second aspect, the network entity is further configured to provide a synchronization message including information indicative of the residence time of the packet in the network system to an external network entity.

In a further implementation form of the second aspect, the network entity is further configured to generate the synchronization message by modifying a synchronization message received from the other network entity, in particular modifying a correction field of the synchronization message, according to the residence time.

In a further implementation form of the second aspect, the network entity is further configured to buffer the packet until the egress time is reached, and provide the packet to an external network entity at the egress time.

In a further implementation form of the second aspect, the network entity is further configured to obtain information indicative of a periodicity of a set of packets that enter the network system periodically, wherein the packet belongs to the set of packets, and determine the egress time of the packet based on the periodicity.

In a further implementation form of the second aspect, the network entity is further configured to synchronize a time with the other network entity, wherein the other network entity is within the wireless network system.

For example, the network entity (e.g., the UE or the UPF) may synchronize the time with the internal network entities. In some embodiments, there is no need for the UE or UPF to do synchronization with the external network entities.

A third aspect of the disclosure provides a network entity for a wireless network system, wherein the network entity is configured to synchronize an internal time valid at the network entity with an external time valid at an external network entity, provide time information to another network entity, wherein the time information includes a mapping of the internal time to the external time.

The network entity (e.g., of the third aspect) may be a UE or a UPF. Moreover, the time information may be provided to another network entity which may be an entity in the network system, for example, another UE or another UPF.

In an implementation form of the third aspect, the time information further includes a domain number, indicating a clock domain of the external time.

For example, the clock domain may include different working clock domains and the global clock domain.

A fourth aspect of the disclosure provides a network entity for a network system, wherein the network entity is configured to obtain time information from another network entity, wherein the time information includes a mapping of an internal time valid at the other network entity and an external time valid at a first external network entity, and synchronize an internal time valid at the network entity with an external time valid at a second external network entity, based on the mapping in the time information.

The network entity (i.e., of the fourth aspect) may be a UE or a UPF. The network entity, e.g., the UE or the UPF may obtain time information from another network entity which may be another UE or another UPF.

A fifth aspect of the disclosure provides a method performed by a network entity for a wireless network system, wherein the method comprises obtaining an ingress time of a received packet, the ingress time indicating the time at which the packet enters the network system, determining time information regarding the packet based on the ingress time, and providing the time information to another network entity.

In an implementation form of the fifth aspect, the time information includes the ingress time of the packet.

In a further implementation form of the fifth aspect, the method further comprises calculating an egress time of the packet, the egress time indicating the time at which the packet leaves the network system, based on the ingress time and a predetermined residence time of the packet in the network system, wherein the time information includes the egress time.

In a further implementation form of the fifth aspect, the method further comprises obtaining a synchronization message associated with the packet, modifying the synchronization message, in particular modifying a correction field of the synchronization message, according to the predetermined residence time, and providing the modified synchronization message to the other network entity.

In a further implementation form of the fifth aspect, the method further comprises determining if the packet belongs to a set of packets that enter the network system periodically, determining a time interval, if the packet belongs to such a set of packets, and providing information indicative of the periodicity to the other network entity, wherein the information indicative of the periodicity is based on the interval.

In an implementation, the time interval is indicative of the periodicity of the set of packets. Based on the knowledge of the time interval, the network entity can determine the egress time. As an example, the network entity determines the egress time of packets in the set of packets based on the egress time of a first packet of the set of packets and on the time interval. In particular, the network entity may add to the egress time of a packet the time interval to obtain the egress time of the next packet.

In a further implementation form of the fifth aspect, the method further comprises incorporating the time information into a timestamp bit-format, and truncating the timestamp bit-format by removing at least one most significant bit and/or at least one least significant bit.

In a further implementation form of the fifth aspect, the method further comprises providing the time information to the other network entity by at least one of:
concatenating the time information with the packet,
including the time information into a payload of the packet,
including the time information into a header of the packet,
generating a further packet including the time information,
using a control message to deliver the time information.

A sixth aspect of the disclosure provides a method performed by a network entity (e.g., the network entity of the second aspect) for a wireless network system, wherein the method comprises obtaining time information regarding a received packet from another network entity, and obtaining an egress time of the packet, the egress time indicating a time at which the packet leaves the network system, based on the time information.

In an implementation form of the sixth aspect, the time information includes an ingress time of the packet, the ingress time indicating a time at which the packet enters the network system, and the method further comprises determining the egress time based on the ingress time.

In a further implementation form of the sixth aspect, the method further comprises determining a residence time of the packet in the network system based on the ingress time and the egress time of the packet.

In a further implementation form of the sixth aspect, the method further comprises determining the egress time of the packet based on the ingress time and a predetermined residence time of the packet in the network system.

In a further implementation form of the sixth aspect, the time information includes the egress time, and the method further comprises extracting the egress time from the time information.

In a further implementation form of the sixth aspect, the method further comprises obtaining a predetermined residence time of the packet in the network system.

In a further implementation form of the sixth aspect, the method further comprises providing a synchronization message including information indicative of the residence time of the packet in the network system to an external network entity.

In a further implementation form of the sixth aspect, the method further comprises generating the synchronization message by modifying a synchronization message received from the other network entity, in particular modifying a correction field of the synchronization message, according to the residence time.

In a further implementation form of the sixth aspect, the method further comprises buffering the packet until the egress time is reached, and provide the packet to an external network entity at the egress time.

In a further implementation form of the sixth aspect, the method further comprises obtaining information indicative of a periodicity of a set of packets that enter the network system periodically, wherein the packet belongs to the set of packets, and determining the egress time of the packet based on the periodicity.

In a further implementation form of the sixth aspect, the method further comprises synchronizing a time with the other network entity, wherein the other network entity is within the wireless network system.

A seventh aspect of the disclosure provides a method performed by a network entity for a wireless network system, wherein the method comprises synchronizing an internal time valid at the network entity with an external time valid at an external network entity, providing time information to another network entity, wherein the time information includes a mapping of the internal time to the external time.

In an implementation form of the seventh aspect, the time information further includes a domain number, indicating a clock domain of the external time.

An eighth aspect of the disclosure provides a method performed by a network entity for a network system, wherein the method comprises obtaining time information from another network entity, wherein the time information includes a mapping of an internal time valid at the other network entity and an external time valid at a first external network entity, and synchronizing an internal time valid at the network entity with an external time valid at a second external network entity, based on the mapping in the time information.

A ninth aspect of the disclosure provides a computer program product comprising a program code for controlling a network entity according to one of the first to fourth aspect, or for carrying out, when implemented on a processor, a method according to one of the fifth to eighth aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings, in which:

FIG. 12 schematically illustrates truncation of timestamp for saving overhead.

FIG. 14 schematically illustrates using reserved data field to deliver the ingress/egress time stamp.

DETAILED DESCRIPTION OF ILLUSTRATIVE EMBODIMENTS

Figure 1:
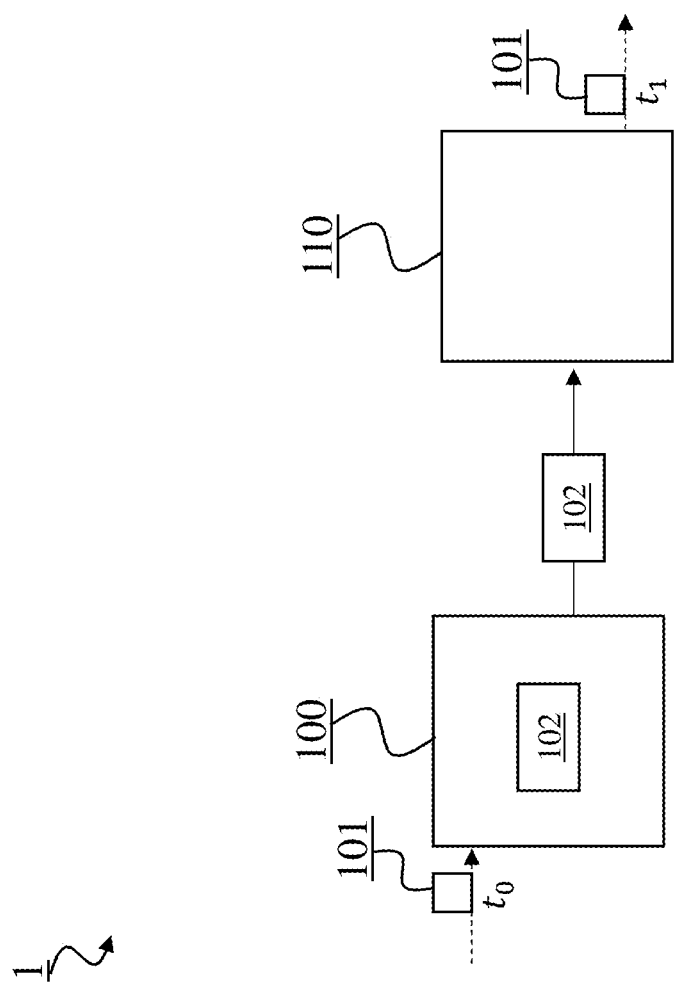
FIG. 1 schematically illustrates a network entity for a wireless network system for determining time information, according to embodiments of the invention.

FIG. 1 schematically illustrates a network entity 100 for a wireless network system 1, for determining time information 102, according to embodiments of the invention.

The network entity 100 and/or the network entity 110 may be the UE or the UPF and the wireless network system 1 may be the 5G network system. For example, the network entity 100 may be the UPF being in the core network of the 5G network system and the other network entity 110 may be the UE (or the UPF) in the 5G network system.

The network entity 100 (e.g., the UE or the UPF) is configured to obtain an ingress time $t_0$ of a received packet 101, the ingress time $t_0$ indicating the time at which the packet 101 enters the network system 1.

The network entity 100 is further configured to determine time information 102 regarding the packet 101 based on the ingress time $t_0$, and provide the time information 102 to another network entity 110.

FIG. 1 also illustrates a network entity 110 for a wireless network system 1, wherein the network entity 110 is configured to obtain time information 102 regarding a received packet 101 from another network entity 100, and obtain an egress time $t_1$ of the packet 101, the egress time $t_1$ indicating a time at which the packet 101 leaves the network system 1, based on the time information 102.

For example, in some embodiments, a new type of UE or UPF may be provided which may record the ingress timestamp and may further signal the timestamp to another UE or another UPF at the other end. The timestamp is in this case an example of time information 102. Moreover, it may further egress a packet according to a specified egress time, correct the correction field using measured delay between ingress and egress times, etc.

Moreover, the signalling for the timestamps, or in general for the time information, between ingress and egress points may be based on, for example:

Direct concatenation of the ingress/egress timestamp with the original data packet to form a PDU packet which can be delivered between UE and UPF within a PDU session, Using reserved data field to deliver the ingress/egress time stamp, Utilizing the optional field of GTP header and PDCP header, Generating an extra PDU following the PDU carrying PTP message, Using a control message to deliver the timestamp, and any combination of these options.

In some embodiments, the measurement of the E2E delay within 5GS (residence time) and correction in synchronization message may be provided, for example:

A first network entity (ingress node) that receives an incoming packet, measures, formats and signals the formatted ingress time to a second network entity.

The first network entity may signal additionally a targeted egress time to the second network entity based on the measured ingress time.

The format may be based on a predetermined maximum expected delay between the first network entity and the second network entity.

A monitoring function may also be provided, for example, for periodic incoming packets, the interval between consecutive packets may be determined and may further be signaled, at the first time, and subsequently only when the interval deviates from the ideal by a predetermined threshold.

In some embodiments, the adaptive buffering may be provided until the fixed E2E delay within the 5GS (residence time), for example:

The second network entity (egress node) that buffers a packet received from the first network entity (ingress node) for a holding time equal to the difference between a pre-determined or signaled residence time and the signaled ingress time from the first network entity.

For periodic or predictable data traffic pattern, the special scheme for reducing signaling overhead significantly may also be provided.

In some embodiments, the formats for representing timestamps may be provided in order to reduce the overheads, for example, it may be based on:

Direct truncation of the most significant digits according to the maximum residence time requirement.

Truncation of the least significant bits according to the precision requirement. Precision requirement and/or residence time is received from an entity in the 5G core network (PCF).

Figure 2:
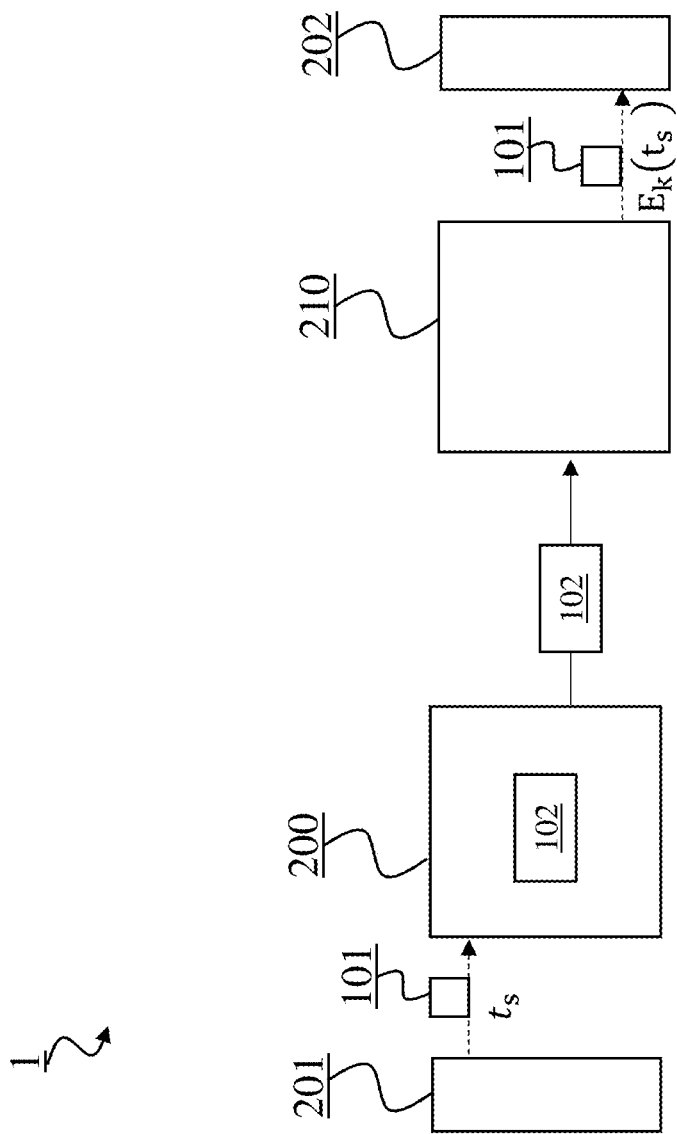
FIG. 2 schematically illustrates a network entity for a wireless network system for synchronizing an internal time with an external time, according to embodiments of the invention.

FIG. 2 schematically illustrates a network entity 200 for a wireless network system 1 for synchronizing an internal time $t_s$ with an external time $E_k(t_s)$, according to various embodiments of the invention.

The network entity 200 is configured to synchronize an internal time $t_s$ valid at the network entity 200 with an external time $E_k(t_s)$ valid at an external network entity 201.

The network entity 200 is further configured to provide time information 102 to another network entity 210, wherein the time information 102 includes a mapping of the internal time $t_s$ to the external time $E_k(t_s)$.

FIG. 2 also illustrates a network entity 210 for a network system 1, wherein the network entity 210 is configured to obtain time information 102 from another network entity 200, wherein the time information 102 includes a mapping of an internal time $t_s$ valid at the other network entity 200 and an external time $E_k(t_s)$ valid at a first external network entity 201, and synchronize an internal time $t_s$ valid at the network entity 210 with an external time $E_k(t_s)$ valid at a second external network entity 202, based on the mapping in the time information 102.

The network entity 100 and the network entity 200 may be the same network entity or may be based on the same type of network entities. For example, both network entities 100 and 200 may be the UE or the UPF. Similarly, the network entity 110 and the network entity 210 may be the same network entity or may be based on the same type of network entities. For example, both network entities 110 and 210 may be the other UE or the other UPF, without limiting the present disclosure to a specific configuration in that regard.

Furthermore, the time information 102 may include the mapping of the internal time $t_s$ valid at the other network entity 200 and the external time $E_k(t_s)$ valid at the first external network entity 201. The mapping may be, for example, comparing the internal time $t_s$ to the external time $E_k(t)$, wherein k is the clock domain number and measuring the frequency offset $\Delta_k$ between the internal time (i.e., the internal clock) and the external time (i.e., the external clock).

Figure 3:
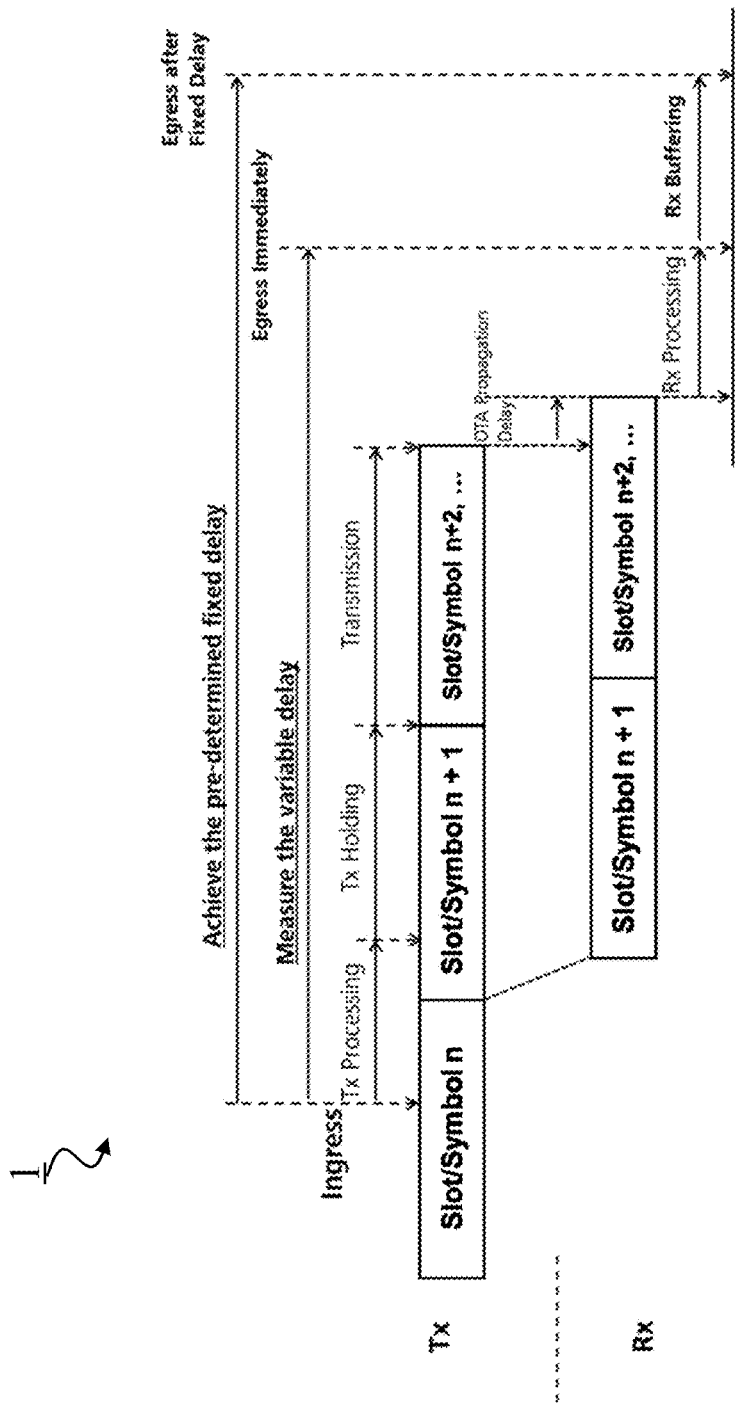
FIG. 3 illustrates an exemplary scheme of timing in a wireless communication system.

FIG. 3 illustrates an exemplary scheme of timing in a wireless communication system 1, which can be carried out by the embodiments of the invention, including the wireless communication system 1 described in FIGS. 1 and 2.

For example, the ingress time of user data is variable. Moreover, the Tx/Rx processing time periods are implementation specific and may also be variable.

Furthermore, the wireless transmission time start at the beginning of a specific slot or a symbol (mini-slot). Hence, the Tx holding time can be obtained, for example, by the network entity 100 by achieving the pre-determined fixed delay and/or measuring the variable delay.

For example, for supporting multiple clock domains with a time-aware relay, the exact residence time of a packet staying in the 5GS may be measured and added in "correctionField" of TSN Sync and Follow_Up messages. The measured delay in real-time can then be provided to the TSN's synchronization protocol for optimizing its accuracy.

Figure 4:
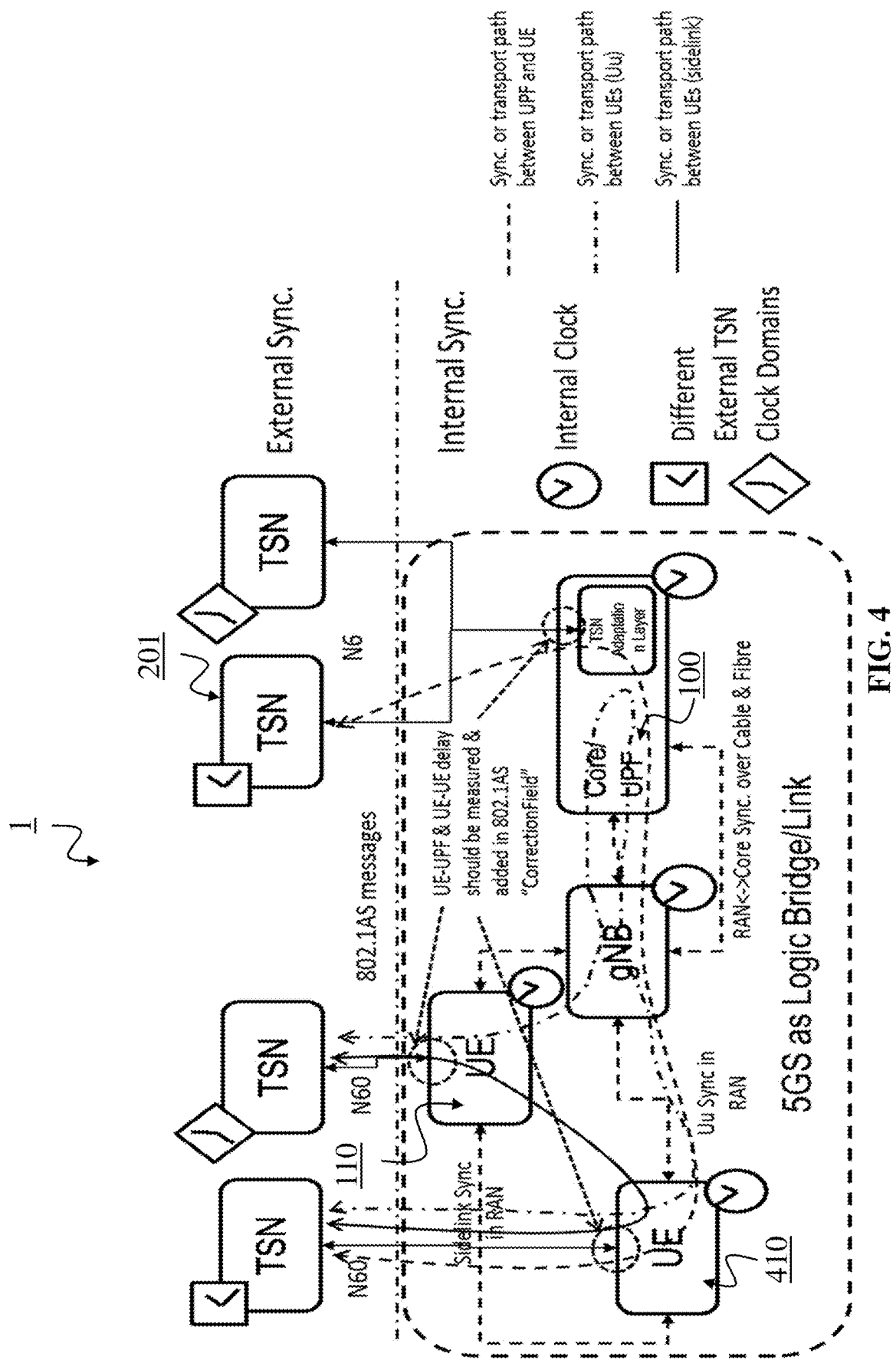
FIG. 4 illustrates an exemplary scheme of an architectural view.

FIG. 4 illustrates an exemplary scheme of an architectural view. The scheme of the architectural view in FIG. 4 is illustrated, as an example, for the wireless network system 1 being the 5G network system comprising one or more network entities. The network entities may be or may include the network entity 100 and/or the network entity 110 and/or the network entity 200 and/or the network entity 210. Without limiting the present disclosure, in following, the scheme of the architectural view is discussed based on the UPF 100 (i.e., the network entity 100) in the core network and the UE 110 being the other network entity (other network entity).

Moreover, the network entity 100 (and/or the network entity 110 and/or the network entity 200 and/or the network entity 210) may further synchronize the internal time with the external time of the external network entity 201 which is the TSN of the 5G network system.

The architectural view comprises the core network (exemplary illustrated with 5GS as Logic Bridge or link) performing an internal E2E synchronization between the UE 110 and the UPF 100 as well as between the UEs 110 and 410 (over Uu or sidelink). In addition, with the 5GS internal sync, it may be possible to achieve the delay measurement between any pair of N60 or N6 interfaces.

Figure 5:
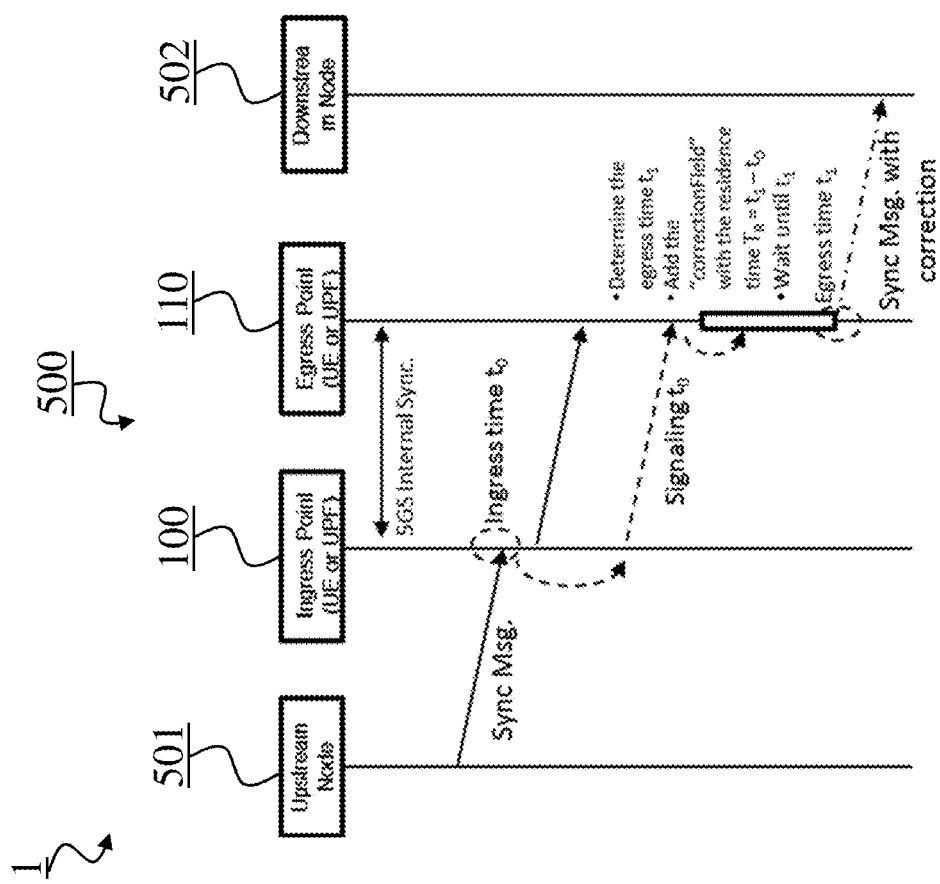
FIG. 5 schematically illustrates a procedure for a live measurement and correction of residence time based on signaling the ingress time.

FIG. 5 schematically illustrates a procedure 500 for a live measurement and correction of residence time based on signaling the ingress time. The procedure 500 may be (for example, fully or partially) performed by the network entity 100 and/or the network entity 110 and/or the network entity 200 and/or the network entity 210, without limiting the present disclosure to a specific network entity in that regard.

In the following, the procedure 500 is exemplarily discussed to be partially performed by the network entity 100 (e.g., the UE or the UPF) being located at the ingress point and the network entity 110 (e.g., the UE or the UPF) being located at the egress point of the wireless network system 1.

In the procedure 500, the network entity 100 (e.g., the UE or the UPF) obtains the synchronization message from the upstream node 501. The network entity 100 further obtains the ingress time $t_0$ and sends a signaling including the $t_0$ to another network entity 110 (another UE or another UPF).

Moreover, the another network entity 110 (another UE or another UPF) may determine the egress time $t_1$, add the "correctionField" with the residence time $T_R = t_1 - t_0$. Furthermore, the another network entity 110 may further wait until the time $t_1$, and at the time of $t_1$ send the synchronization message with correction to downstream node 502.

The procedure 500 for the live measurement and correction of residence time based on the signaling the ingress time may be applicable to variable delays in 5GS. The procedure 500 may be used in applications with bounded delay requirements. Further, the procedure 500 does not require changes to the 5G Quality of Service (QoS) framework.

Figure 6:
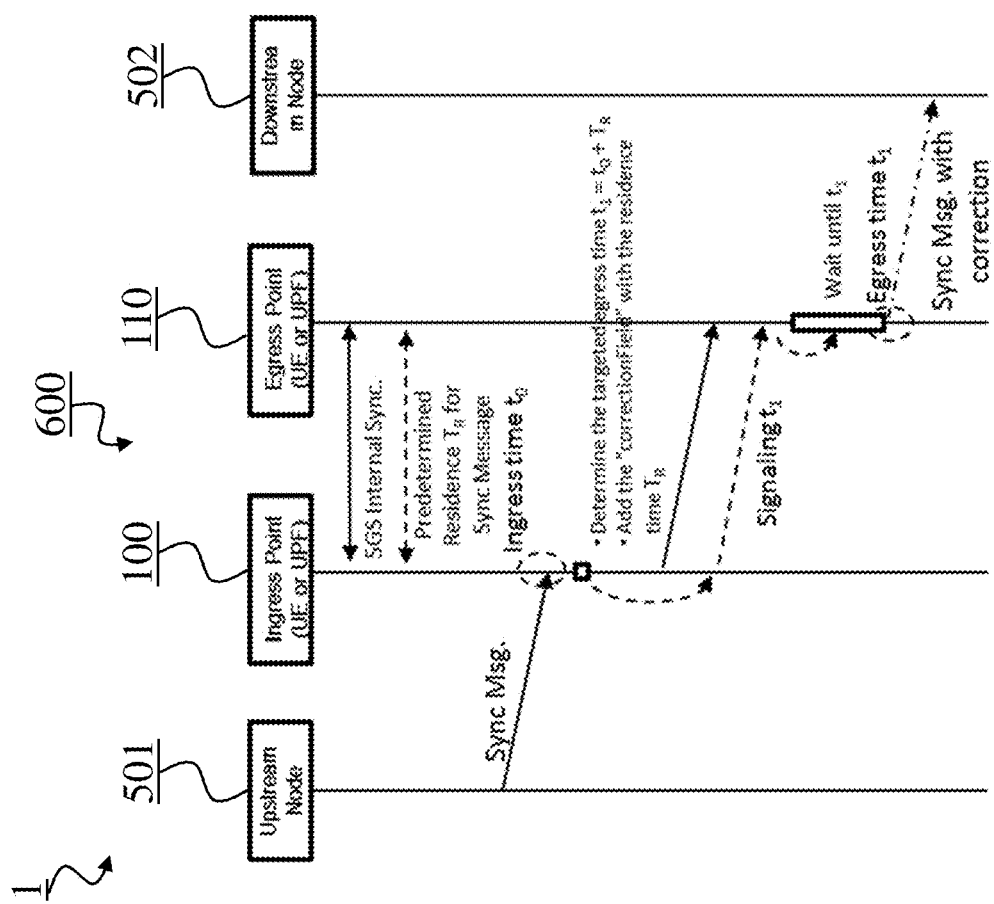
FIG. 6 schematically illustrates a procedure for a live measurement and correction of residence time based on signaling the targeted egress time.

FIG. 6 schematically illustrates a procedure 600 for a live measurement and correction of residence time based on signaling the targeted egress time. The procedure 600 may be (for example, fully or partially) performed by the network entity 100 and/or the network entity 110 and/or the network entity 200 and/or the network entity 210, without limiting the present disclosure to a specific network entity in that regard.

In the following, the procedure 600 is exemplarily discussed to be partially performed by the network entity 100 (e.g., the UE or the UPF) located at the ingress point and the network entity 110 (e.g., the UE or the UPF) located at the egress point of the wireless network system 1.

In the procedure 600, the network entity 100 (e.g., the UE or the UPF) obtains the synchronization message from the upstream node 501. The network entity 100 further obtains the ingress time $t_0$. The network entity 100 may further determine the targeted egress time $t_1$ and add the "correctionField" with the residence time $t_1=t_0+T_R$. The network entity 100 may further send a signaling including the $t_1$ to another network entity 110 (another UE or another UPF).

The another network entity 110 may wait until the time $t_1$, and at the time of $t_1$ send the synchronization message with correction to downstream node 502.

The procedure 600 for the live measurement and correction of residence time based on the signaling the targeted egress time may be applicable to fixed delays in 5GS. The procedure 600 may be used in applications with fixed delay/bounded jitter requirements.

In some embodiments, an adaptive buffering may be provided, for example, until a fixed residence time.

Figure 7:
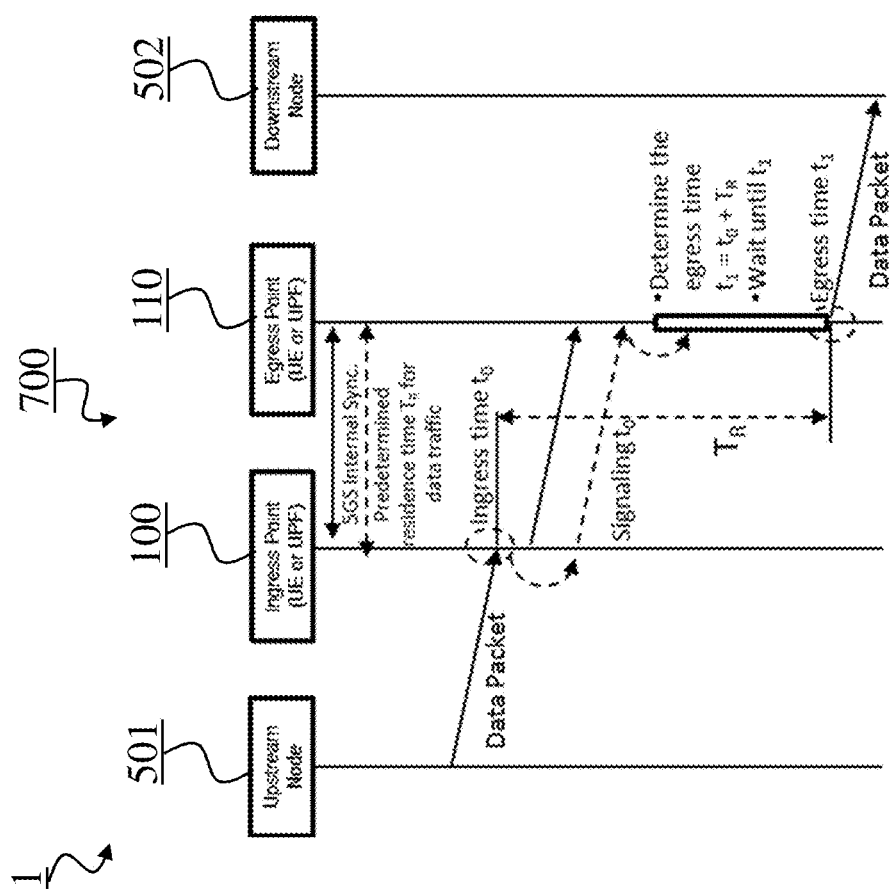
FIG. 7 schematically illustrates a procedure for adaptive buffering based on signaling the ingress time.

FIG. 7 schematically illustrates a procedure 700 for adaptive buffering based on signaling the ingress time. The procedure 700 may be (for example, fully or partially) performed by the network entity 100 and/or the network entity 110 and/or the network entity 200 and/or the network entity 210, without limiting the present disclosure to a specific network entity in that regard.

In the following, the procedure 700 is exemplarily discussed to be partially performed by the network entity 100 (e.g., the UE or the UPF) located at the ingress point and the network entity 110 (e.g., the UE or the UPF) located at the egress point of the wireless network system 1.

Figure 8:
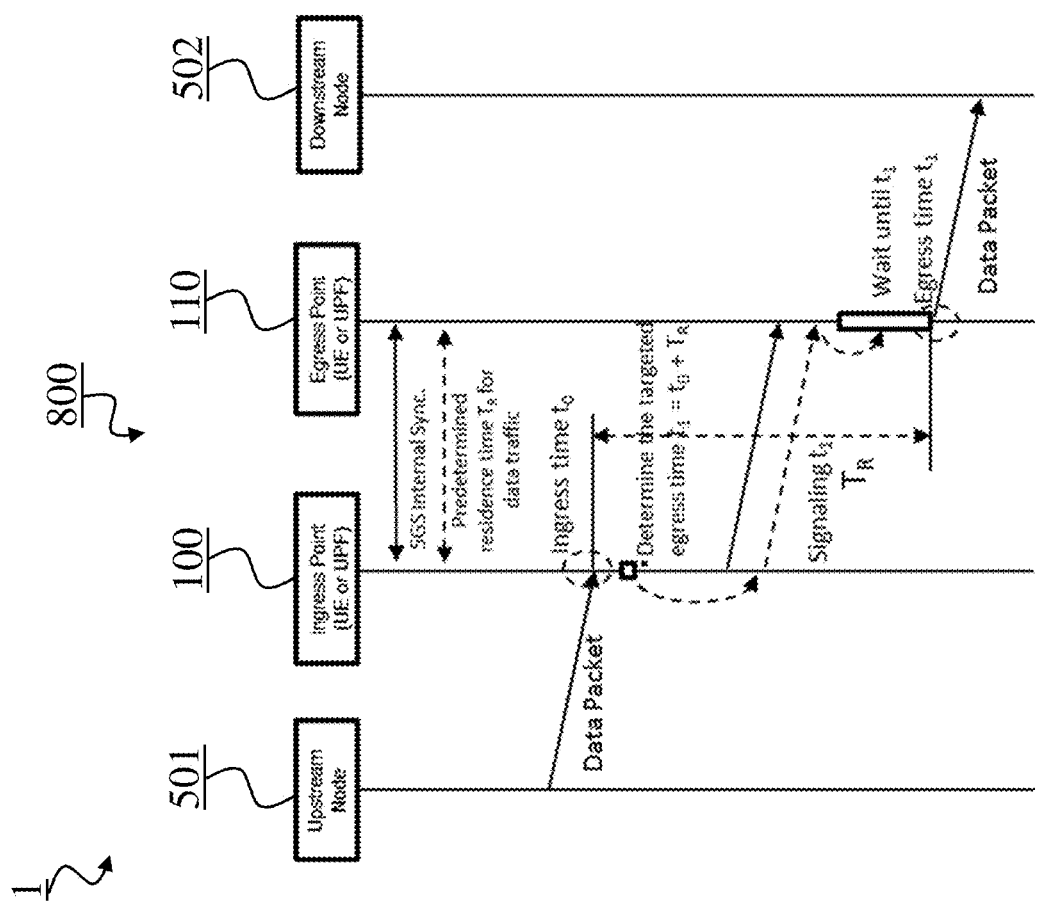
FIG. 8 schematically illustrates a procedure for adaptive buffering based on signaling the targeted egress time.

Moreover, FIG. 8 schematically illustrates a procedure 800 for adaptive buffering based on signaling the targeted egress time. The procedure 800 may be (for example, fully or partially) performed by the network entity 100 and/or the network entity 110 and/or the network entity 200 and/or the network entity 210, without limiting the present disclosure to a specific network entity in that regard.

In the following, the procedure 800 is exemplarily discussed to be partially performed by the network entity 100 (e.g., the UE or the UPF) located at the ingress point and the network entity 110 (e.g., the UE or the UPF) located at the egress point of the wireless network system 1.

The adaptive buffering at the egress node may ensure that a precise residence time in the 5GS is maintained.

Moreover, the buffering time may be determined based on either:

1) Pre-determined residence time and the signaled ingress time,
2) Pre-determined residence time and the signaled target egress time.

Furthermore, the adaptive buffering may rely on 5GS internal synchronization in the user-plane, for example:

1) The 5GS internal synchronization delays may be compensated by adjusting the residence time or the targeted egress time.
2) The estimated 5GS internal sync error may be signaled as a follow-up message from the ingress point to the egress point.

In the procedure 700 of FIG. 7, the traffic with random arriving time based on signaling the ingress time, the network entity 100 (e.g., the UE or the UPF) obtains the data packet from the upstream node 501. The network entity 100 further obtains the ingress time $t_0$ and sends a signaling including the $t_0$ to another network entity 110 (another UE or another UPF). Moreover, the another network entity 110 (another UE or another UPF) may determine the egress time $t_1=t_0+T_R$ and wait until the time $t_1$. At the egress time $t_1$, the another network entity 110 may send the data packet to downstream node 502.

In the procedure 800 of FIG. 8, the traffic with random arriving time based on signaling the targeted egress time, the network entity 100 (e.g., the UE or the UPF) obtains the data packet from the upstream node 501. The network entity 100 obtains the ingress time $t_0$ and may determine the targeted egress time $t_1=t_0+T_R$. Moreover, the network entity 100 sends a signaling including the $t_1$ to another network entity 110 (another UE or another UPF). The another network entity 110 (another UE 110 or another UPF 110) may wait until the time $t_1$. At the egress time $t_1$, the another network entity 110 sends the data packet to downstream node 502.

In some embodiments, a fixed residence time may be achieved.

Figure 9:
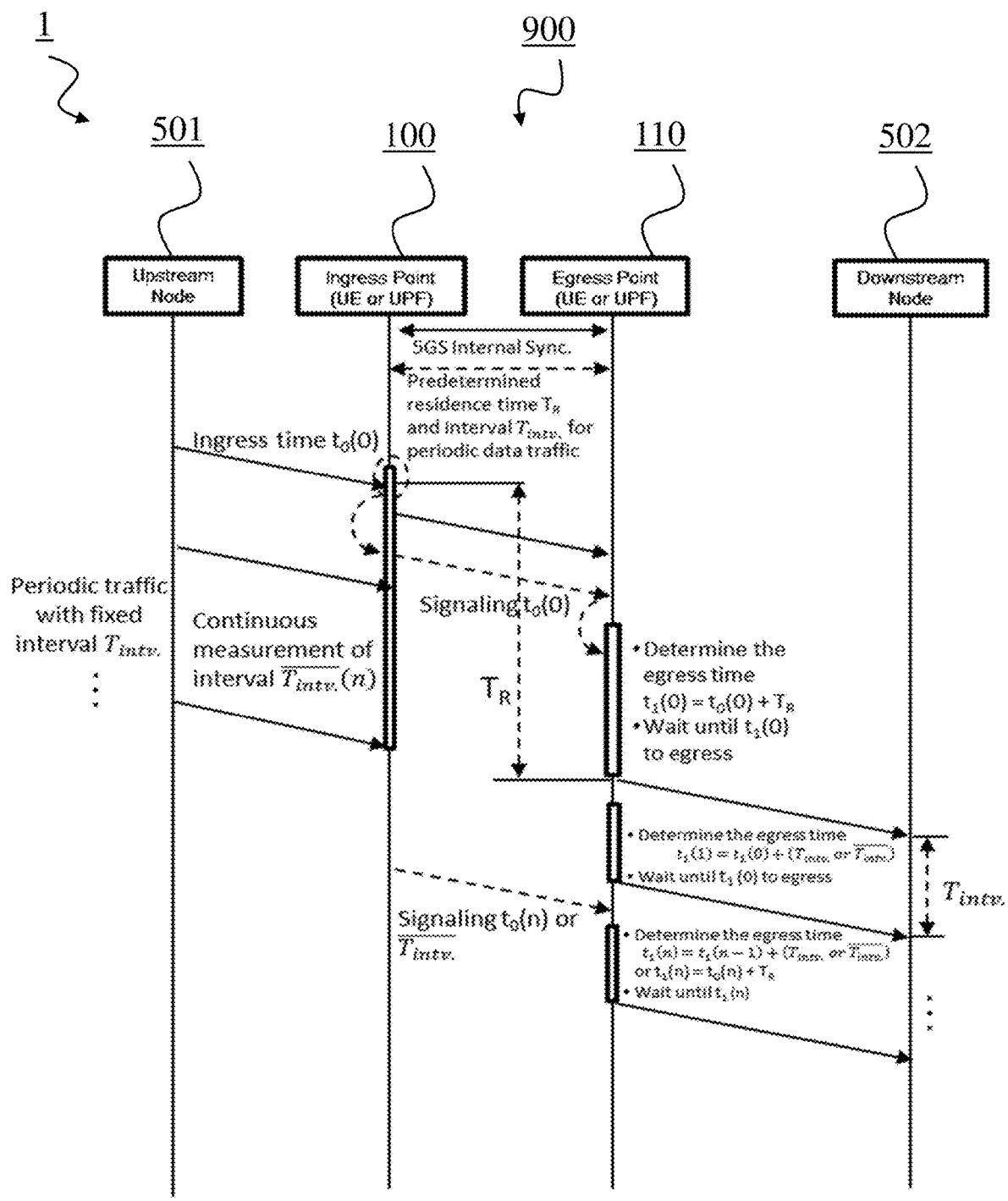
FIG. 9 schematically illustrates a procedure for achieving the fixed residence time for periodic or predictable traffic pattern based on signaling of ingress timestamp.

FIG. 9 schematically illustrates a procedure 900 for achieving fixed residence time for periodic or predictable traffic pattern based on signaling of ingress timestamp. The procedure 900 may be (for example, fully or partially) performed by the network entity 100 and/or the network entity 110 and/or the network entity 200 and/or the network entity 210, without limiting the present disclosure to a specific network entity in that regard.

In the following, the procedure 900 is exemplarily discussed to be partially performed by the network entity 100 (e.g., the UE or the UPF) located at the ingress point and the network entity 110 (e.g., the UE or the UPF) located at the egress point of the wireless network system 1.

In the procedure 900, the fixed residence time for periodic or predictable traffic pattern may be achieved based on signaling of ingress timestamp, for example, by:

For isochronous data traffic, which is quite common in IA, the ingress time is periodic or has predictable pattern.

The ingress/egress time become predictable and the signaling of each packet's ingress/egress timestamp within the 5GS becomes unnecessary, for example, according to:

Ingress: $t_0(n)=t_0(n-1)+T_{intv.}=t_0(0)+n \cdot T_{intv.}$

Egress: $t_1(n)=(n-1)+T_{intv.}=t_1(0)+n \cdot T_{intv.}$

Considering the clock mismatch between 5GS and external nodes.

The packet interval may be continuously measured, denoted by $\overline{T_{intv.}}$.

The timestamp $t_0(n)$ and the measured interval $\overline{T_{intv.}}$ may be signaled to the egress point for correcting the egress time.

Due to the periodicity of data traffic, the signaling of the timestamp $t_0(n)$ and the measured interval $\overline{T_{intv.}}$ is not adhered to each data packet, but multiple ones, which may save most part of signaling overhead.

Additionally, only changes in the measured interval may be signaled to the egress node.

Figure 10:
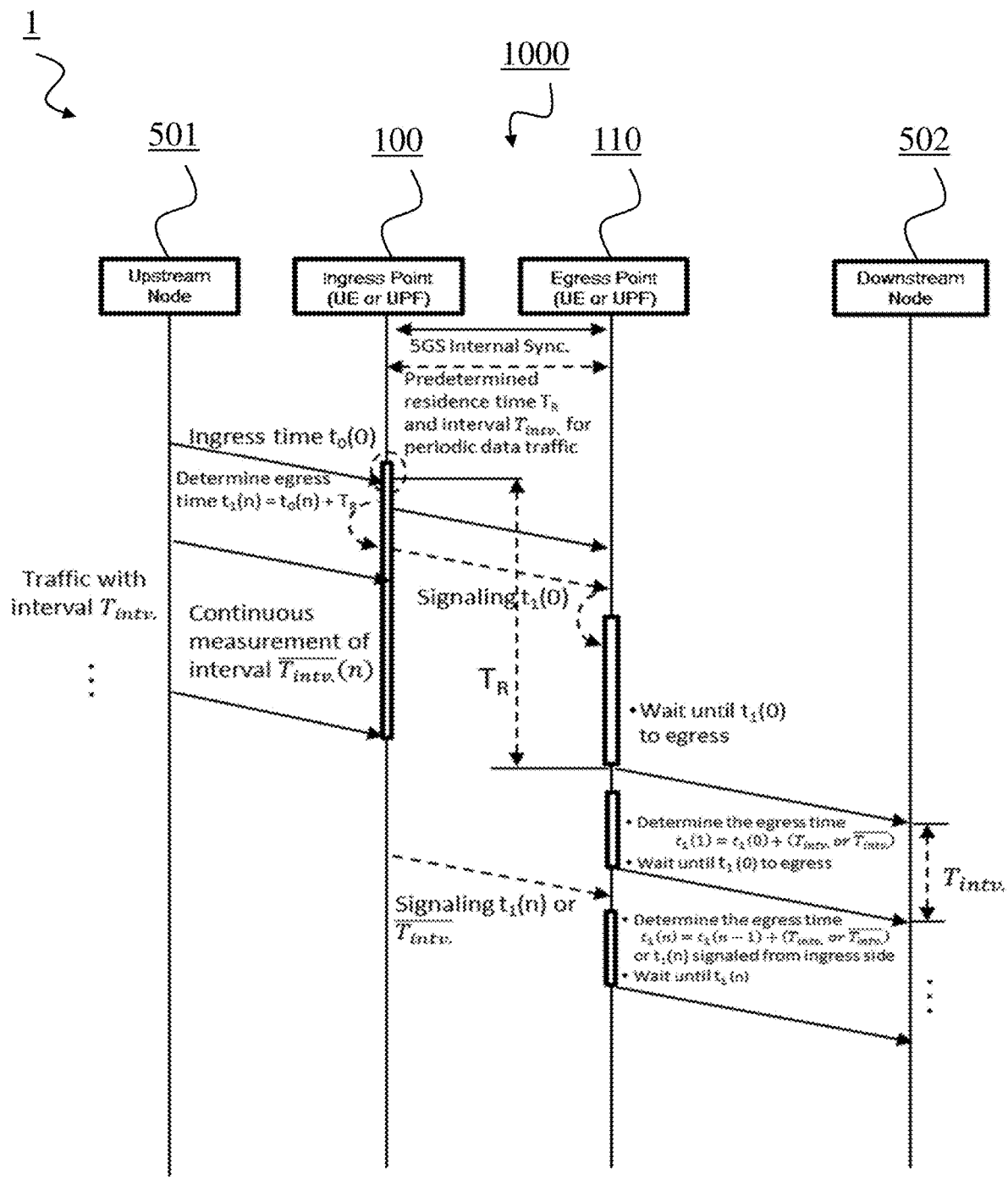
FIG. 10 schematically illustrates a procedure for achieving the fixed residence time for periodic or predictable traffic pattern based on signaling of egress timestamp.

Moreover, FIG. 10 schematically illustrates a procedure 1000 for achieving fixed residence time for periodic or predictable traffic pattern based on signaling of egress timestamp. The procedure 1000 may be (for example, fully or partially) performed by the network entity 100 and/or the network entity 110 and/or the network entity 200 and/or the network entity 210, without limiting the present disclosure to a specific network entity in that regard.

In the following, the procedure 1000 is exemplarily discussed to be partially performed by the network entity 100 (e.g., the UE or the UPF) located at the ingress point and the network entity 110 (e.g., the UE or the UPF) located at the egress point of the wireless network system 1.

In the procedure 1000, the fixed residence time for periodic or predictable traffic pattern may be achieved based on signaling of egress timestamp, for example, by:

For isochronous data traffic which is quite common in IA, the ingress time is periodic or has predictable pattern.

The ingress/egress time become predictable and the signaling of each packet's ingress/egress timestamp is unnecessary, according to:

Ingress: $t_0(n) = t_0(n-1) + T_{intv.} = t_0(0) + n \cdot T_{intv.}$

Egress: $t_1(n) = (n-1) + T_{intv.} = t_1(0) + n \cdot T_{intv.}$

Considering the clock mismatch between the 5GS and the external nodes.

The packet interval may be continuously measured, denoted by $\overline{T_{intv.}}$.

The timestamp $t_0(n)$ or $t_1(n)$ and the measured interval $\overline{T_{intv.}}$ may be signaled to the egress point for correcting the egress time.

For periodic traffic (3C/3D), a monitoring function at the ingress point may be proposed to monitor the changes in the ingress time intervals, and accordingly, signal the change as a correction to the egress node. This may further reduce the signaling overhead.

Figure 11:
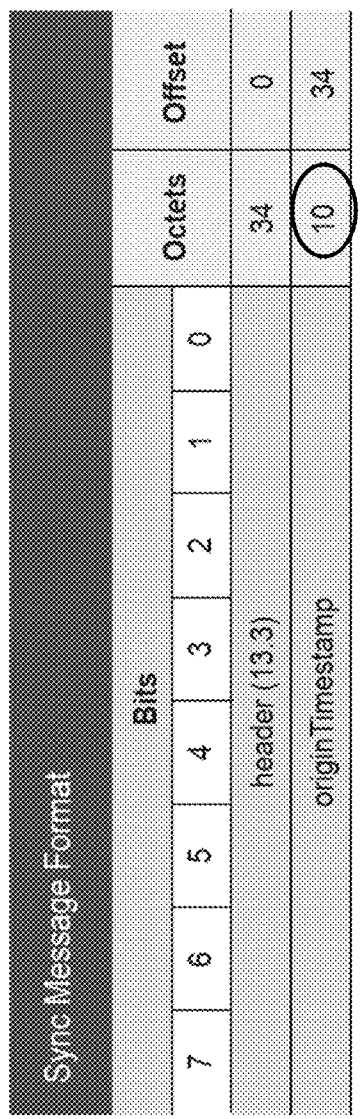
FIG. 11 schematically illustrates a synchronization message format including high amount of data in IEEE 1588 timestamp.

In some embodiments, a timestamp compression may be provided. FIG. 11 schematically illustrates a synchronization message format including high amount of data in IEEE 1588 timestamp. The compression may be performed by the network entity 100 and/or the network entity 110 and/or the network entity 200 and/or the network entity 210, without limiting the present disclosure to a specific network entity in that regard.

The high amount of data in existing timestamp scheme may be compressed (e.g., by the network entity 100), as it is illustrated in FIG. 11, for example:

In IEEE 1588 and 802.1AS protocols: 10 Octets, 80 bit.

Moreover, since the residence time is normally small (<10 ms), the timestamp data may further be truncated for saving the overhead, for example, by:

Truncation of a group of most significant digits according to the maximum residence time.

Truncation of a group of least significant digits according to the precision requirement.

FIG. 12 schematically illustrates truncation of timestamp for saving overhead. The truncation of the timestamp may be performed by the network entity 100 and/or the network entity 110 and/or the network entity 200 and/or the network entity 210, without limiting the present disclosure to a specific network entity in that regard. For example, by assuming the original timestamp of 10 octets (80 bit) with precision of 1 ns, by truncating bits #1~6 and #24~79 (preserving bits #7~#23), the maximum residence time of 16.8 ms with precision of 128 ns may be handled. Moreover, the PCF may be based on (1) the maximum residence time (delay) and (2) precision requirement to specify the truncation of the most/least significant digits.

Figure 13:
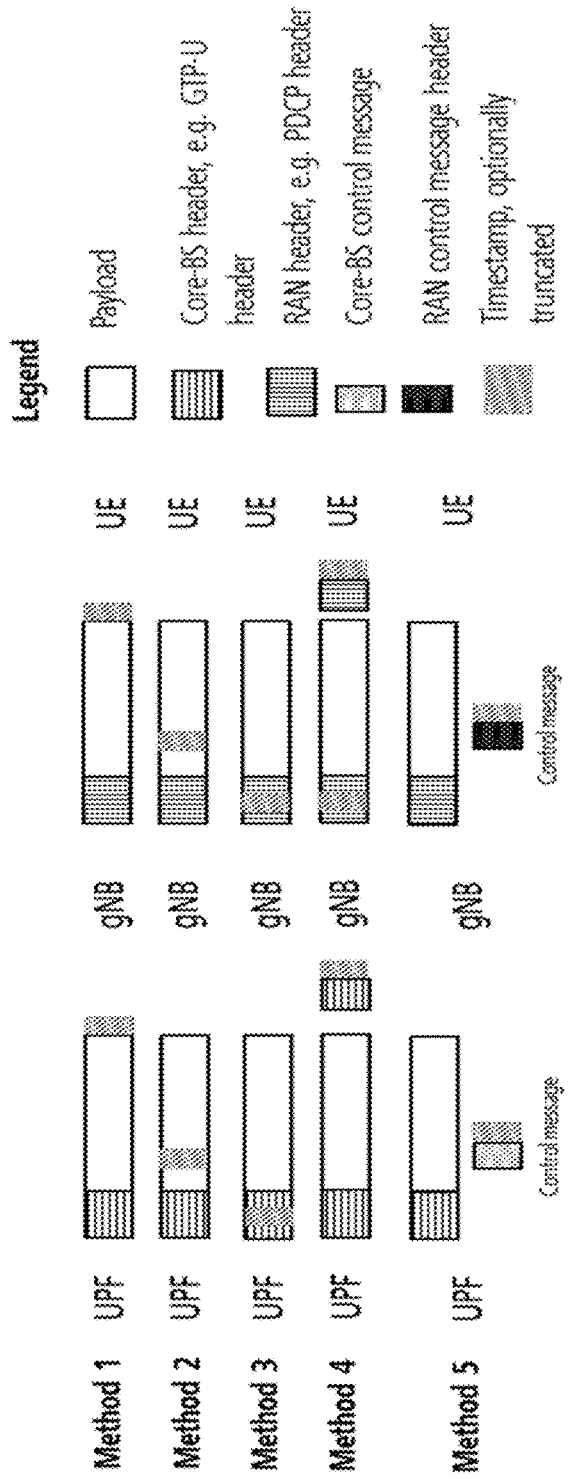
FIG. 13 schematically illustrates signaling methods for timestamps between ingress and egress points.

In some embodiments, the signaling methods for timestamps between the ingress and the egress points may be provided. FIG. 13 schematically illustrates signaling methods for timestamps between ingress point (for example, it may be performed by the network entity 100 or the network entity 200 located at the ingress point) and egress points (for example, it may be performed by the network entity 110 or the network entity 210 located at the egress point).

The ingress times and/or the egress times and/or the residence times may be signaled in various ways between the ingress and egress points, for example:

Direct concatenation of the ingress/egress timestamp with the original data packet to form a PDU packet which may be delivered between the UE and the UPF within a PDU session.

Using reserved data field to deliver the ingress/egress time stamp.

Utilize the optional field of GTP header and PDCP header.

Generating an extra PDU following the PDU carrying PTP message.

Using a control message to deliver the timestamp.

FIG. 14 schematically illustrates using reserved data field to deliver the ingress/egress time stamp. In FIG. 14, the reserved data field are used to deliver the ingress time stamp (for example, it may be performed by the network entity 100 or the network entity 200 located at the ingress point) and the egress time stamp (for example, it may be performed by the network entity 110 or the network entity 210 located at the egress point). Moreover, the reserved field of 32 bits in PTP header may be sufficient to accommodate timestamp with nanosecond precision and hundred millisecond of range.

Figure 15:
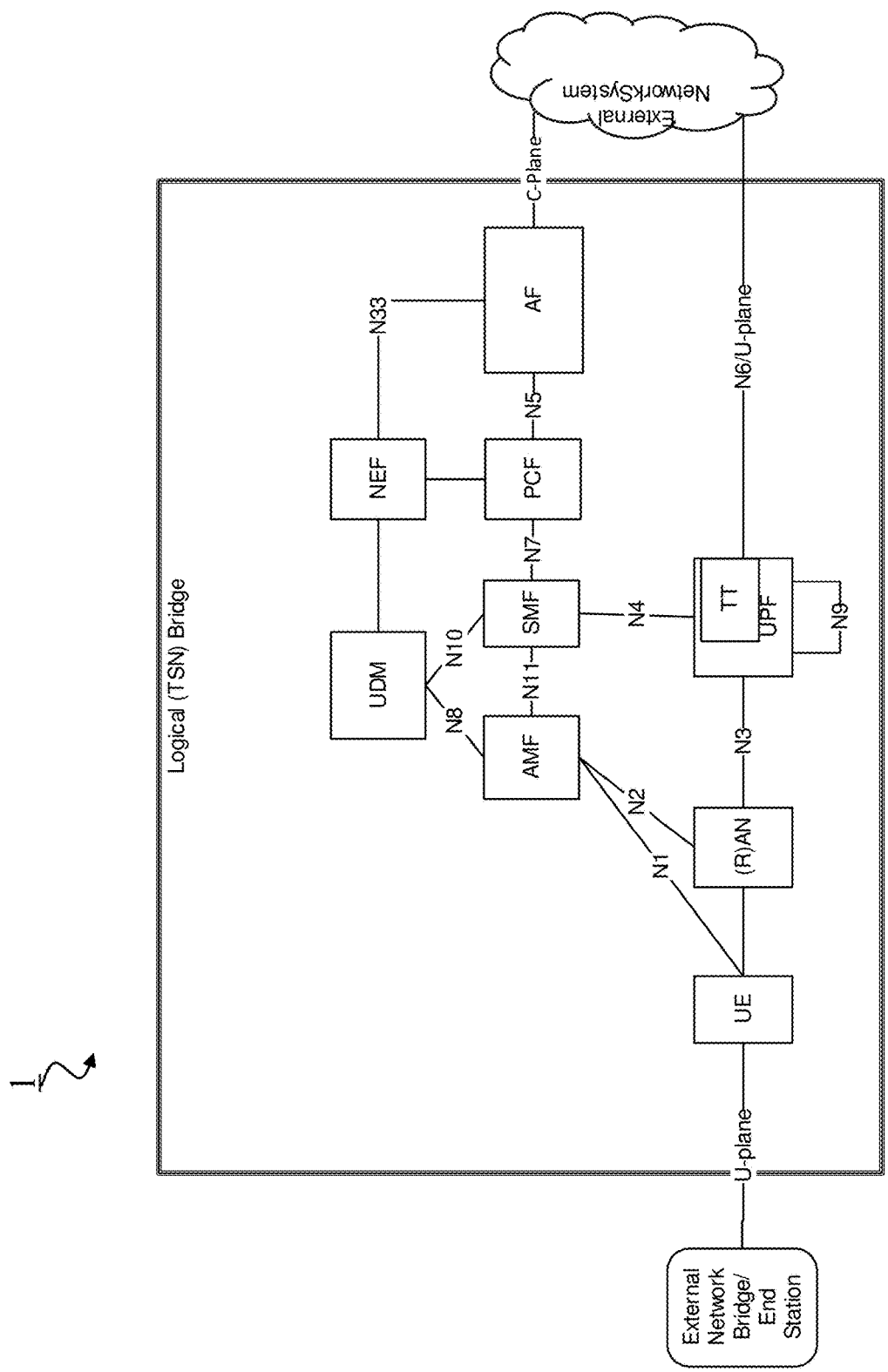
FIG. 15 schematically illustrates a reference architecture in 5GS.

In some embodiments, the reference architecture and signaling within 5G system may be provided. FIG. 15 schematically illustrates a reference architecture in 5GS. In FIG. 15, the wireless network system 1 is exemplarily discussed to be the 5G network system. Moreover, the network entity 100 and/or the network entity 110 and/or the network entity 200 and/or the network entity 210 may be the UE or the UPF in the 5G network system.

The reference architecture to configure the network for high accuracy time synchronization may be provided, for example, based on:
1. Point coordination function (PCF) agrees with application function (AF) on the residence time, and traffic profile (e.g., interval, granularity of time measurement, etc.).
2. PCF communicates the requirements to the serving Session Management Function (SMF).
3. SMF configures the UPF (ingress/egress) on the time related treatment
   Retrieve the time stamp.
   Process the time stamp (compression, calculation, etc.).
   Apply the calculation results (e.g., buffering control, modify/add the packet, reporting to the SMF, etc.).

Moreover, the reference architecture to communicate the time assistance info over CP, may also be provided, for example, based on:
1. Quasi static time assistance information can be communicated via CP.

Truncated the most and the least significant digits of the time stamp. Periodic synchronization errors.

2. The procedure may be as follow:
- SMF may decide on the static time assistance info with the help of ingress/egress UPF following the policy defined by the PCF (e.g., based on the TSN QoS profile).
- SMF may communicate the related assistance info to the ingress UPF and the egress UPF via the N4.

Figure 16:
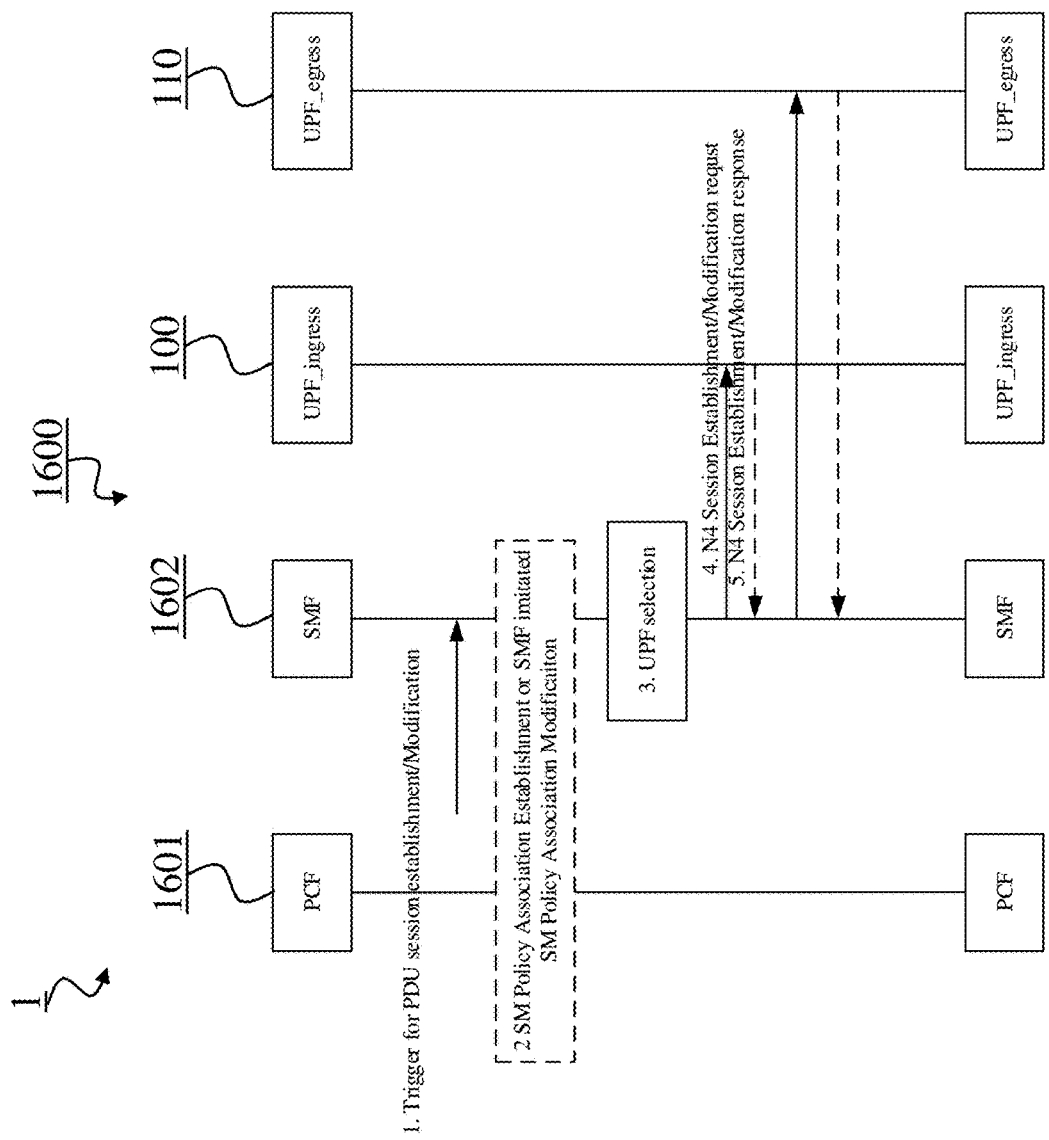
FIG. 16 illustrates an exemplary scheme of communicating the static time assistance information using the control plane (CP) signaling.

FIG. 16 illustrates an exemplary scheme of communicating the static time assistance information using the CP signaling. The procedure 1600 may be (for example, fully or partially) performed by the network entity 100 and/or the network entity 110 and/or the network entity 200 and/or the network entity 210, without limiting the present disclosure to a specific network entity in that regard.

In the following, the procedure 1600 is exemplarily discussed to be partially performed by the network entity 100 (e.g., the UPF) located at the ingress point and the network entity 110 (e.g., the UPF) located at the egress point of the wireless network system 1.

Examples of communicating the static time assistance information using the CP signaling, may be as follows:

At step 1: the PCF 1601 triggers the SMF 1602 for PDU session establishment or modification.

At step 2: the SMF 1602 gets the TSN related policy from the PCF 1601 (e.g., whether this session needs the UP synchronization, accuracy of the UP synchronization, etc.).

At step 3: the SMF 1602 selects the UPF based on the synchronization requirements from the PCF 1601 and synchronization capability of the UPF. In this step, the SMF may optionally decide on the static time assistance info with the help of ingress/egress UPF following the policy defined by PCF (e.g., based on the TSN QoS profile).

At step 4 to 5: the SMF configures the ingress UPF 100 or the egress UPF 110 with the static time assistance info.

Note that the steps 4 to 5 may be trigged by the SMF 1602 using the N2 session modification procedure in order to update the static time assistance info whenever necessary. Moreover, the steps 4 to 5 may also be used from the SMF 1602 in order to configure the UPF on the time related treatment.

Figure 17:
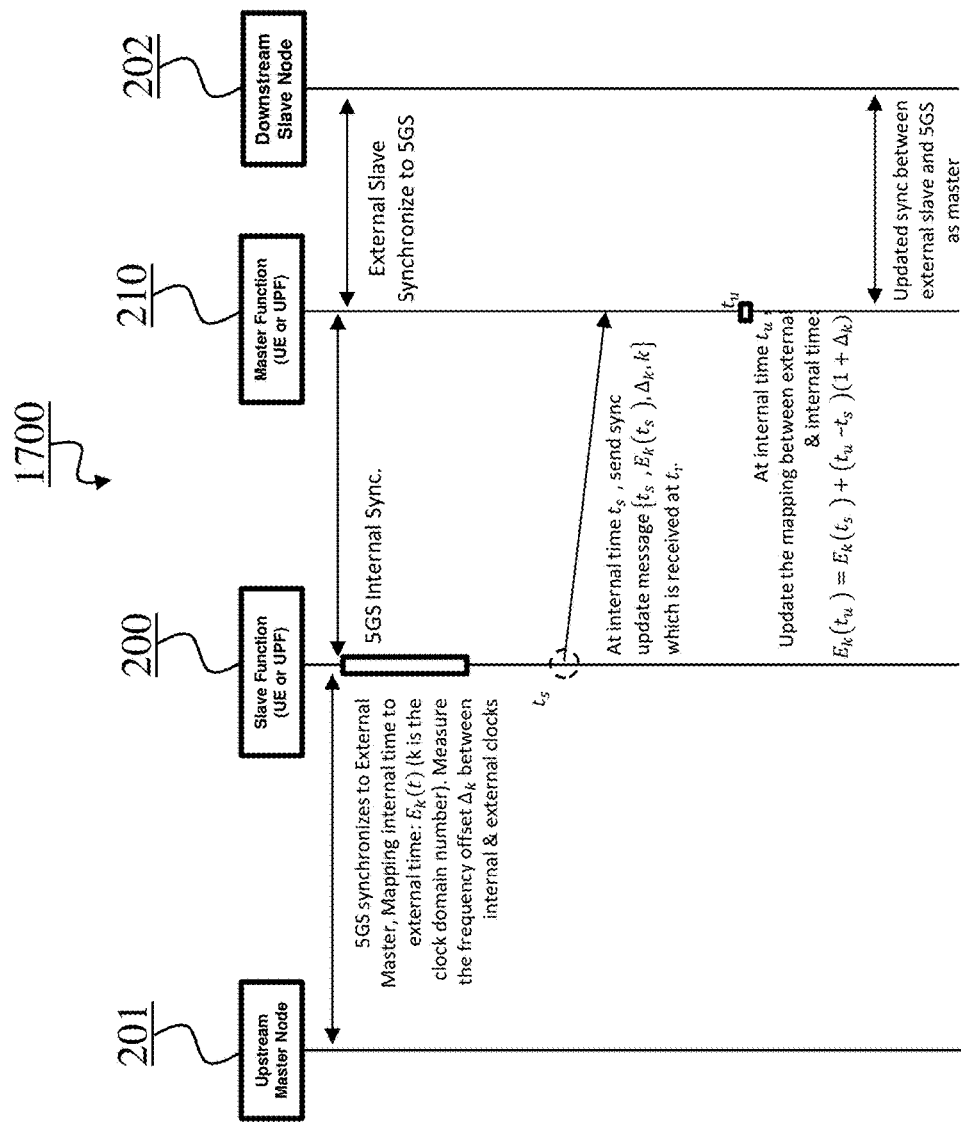
FIG. 17 illustrates an exemplary scheme of a boundary clock based propagation of synchronization without transparent delivery of message.

FIG. 17 illustrates an exemplary scheme 1700 of boundary clock based propagation of synchronization without transparent delivery of message. The procedure 1700 may be (for example, fully or partially) performed by the network entity 100 and/or the network entity 110 and/or the network entity 200 and/or the network entity 210, without limiting the present disclosure to a specific network entity in that regard.

In the following, the procedure 1700 is exemplarily discussed to be partially performed by the network entity 200 (e.g., the UE or the UPF) performing the slave function and the network entity 210 (e.g., the UE or the UPF) performing the master function.

In some embodiments, the transmission of a timestamp within 5GS may not be triggered by an external sync message but triggered autonomously by the Slave Function 100 within the 5GS. In some embodiments, not only the internal timestamp $t_s$ but also its according external time $E_k(t_s)$, the domain number k, and, optionally, the external to internal frequency offset $E_k$ may be transferred to the Master Function 110 in one or more message(s) $\{t_s, E_k(t_s), \Delta_k, k\}$.

Figure 18:
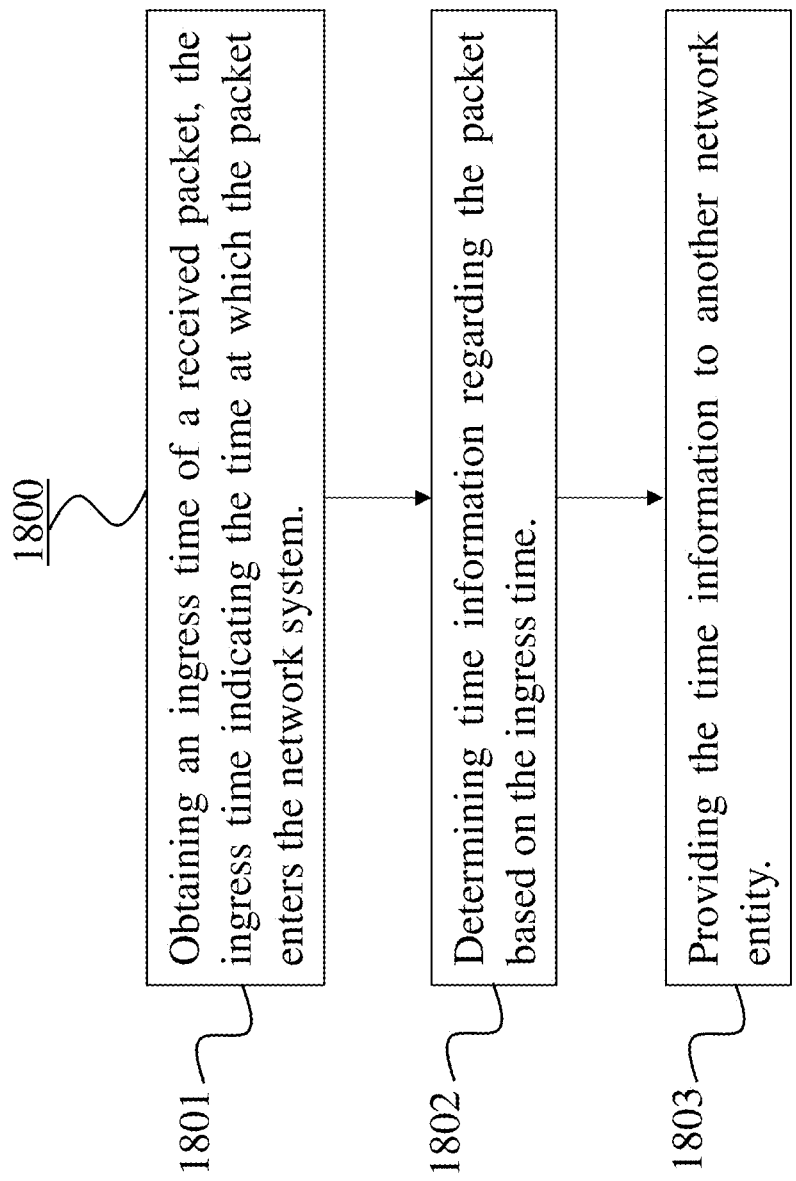
FIG. 18 schematically illustrates a method for a network entity for a wireless network system, according to an embodiment of the invention.

FIG. 18 shows a method 1800 according to an embodiment of the invention for a network entity 100 for a wireless network system 1. The method 1800 may be carried out by the device 100, as it is described above.

The method 1800 comprises a step 1801 of obtaining an ingress time $t_0$ of a received packet 101, the ingress time $t_0$ indicating the time at which the packet 101 enters the network system 1.

The method 1800 further comprises a step 1802 of determining time information 102 regarding the packet 101 based on the ingress time $t_0$.

The method 1800 further comprises a step 1803 of providing the time information 102 to another network entity 110.

Figure 19:
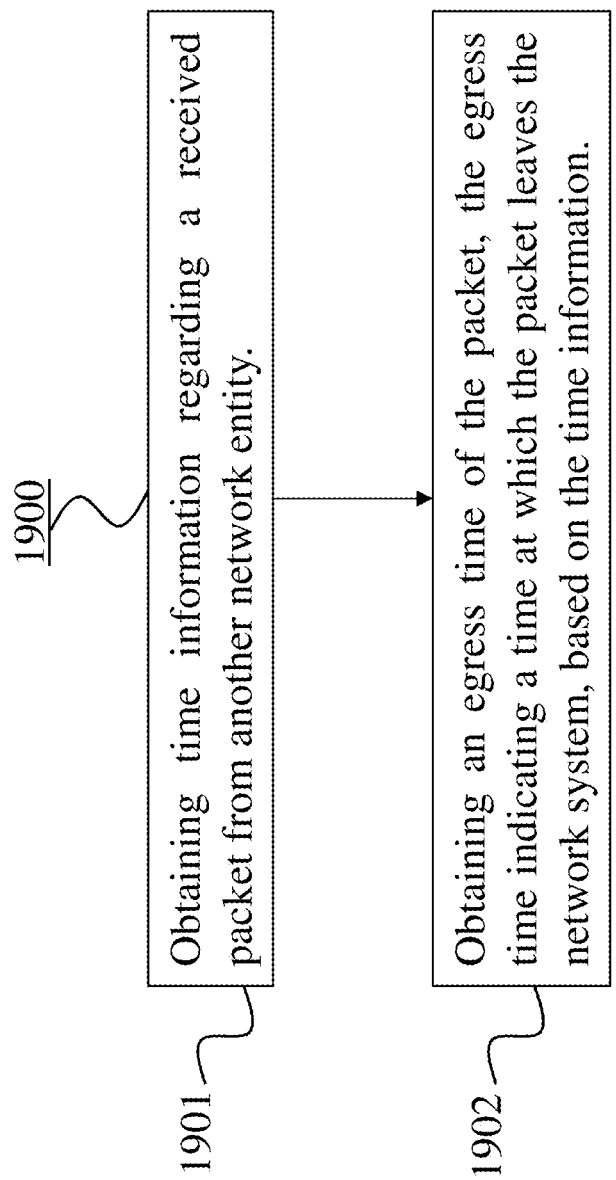
FIG. 19 schematically illustrates a method for a network entity for a wireless network system, according to an embodiment of the invention.

FIG. 19 shows a method 1900 according to an embodiment of the invention for a network entity 110 for a wireless network system 1. The method 1900 may be carried out by the device 110, as it is described above.

The method 1900 comprises a step 1901 of obtaining time information 102 regarding a received packet 101 from another network entity 100.

The method 1900 further comprises a step 1902 of obtaining an egress time $t_1$ of the packet 101, the egress time $t_1$ indicating a time at which the packet 101 leaves the network system 1, based on the time information 102.

Figure 20:
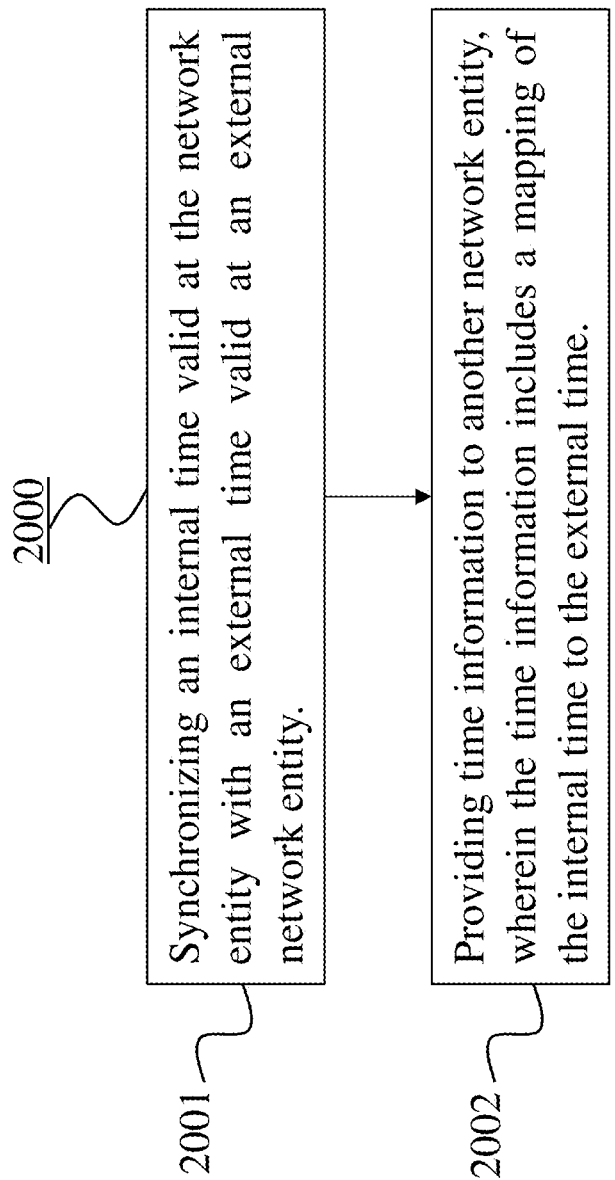
FIG. 20 schematically illustrates a method for a network entity for a wireless network system, according to an embodiment of the invention.

FIG. 20 shows a method 2000 according to an embodiment of the invention for a network entity for a wireless network system 1. The method 2000 may be carried out by the device 200, as it is described above.

The method 2000 comprises a step 2001 of synchronizing an internal time $t_s$ valid at the network entity 200 with an external time $E_k(t_s)$ valid at an external network entity 201.

The method 2000 further comprises a step 2002 of providing time information 102 to another network entity 210, wherein the time information 102 includes a mapping of the internal time $t_s$ to the external time $E_k(t_s)$.

Figure 21:
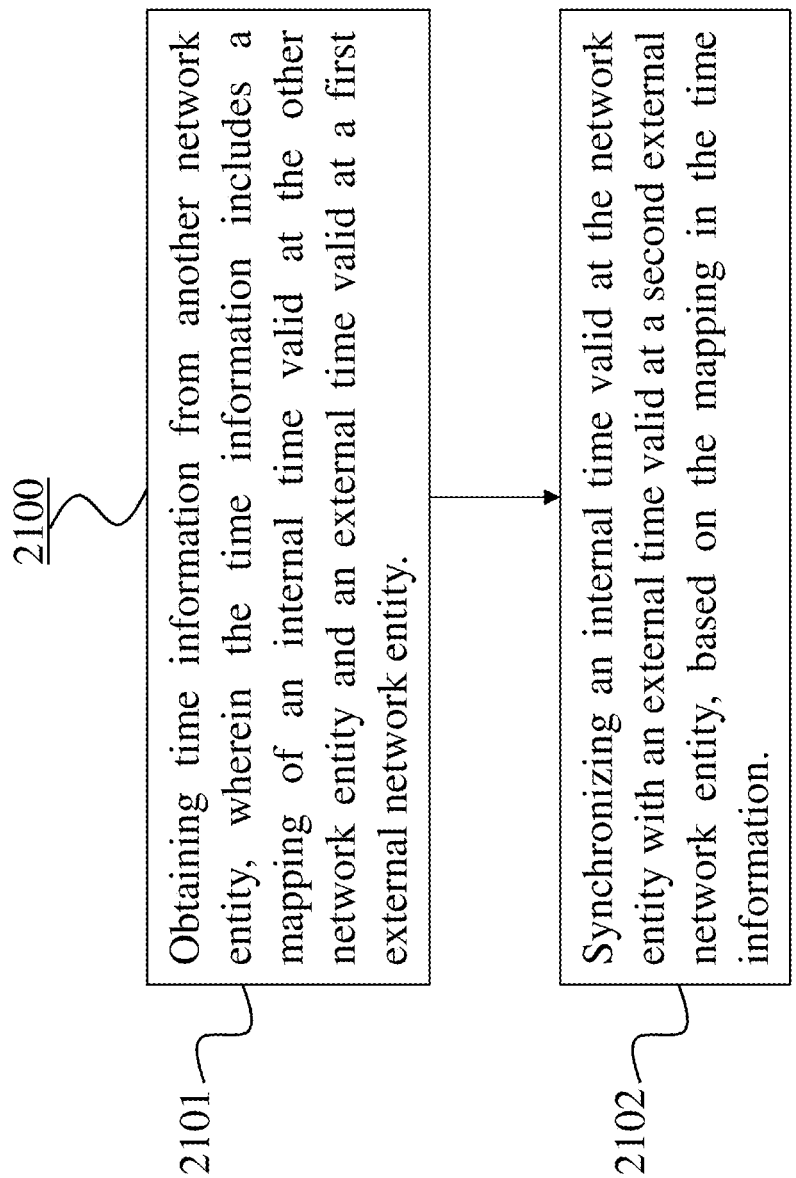
FIG. 21 schematically illustrates a method for a network entity for a wireless network system, according to an embodiment of the invention.
Figure 22:
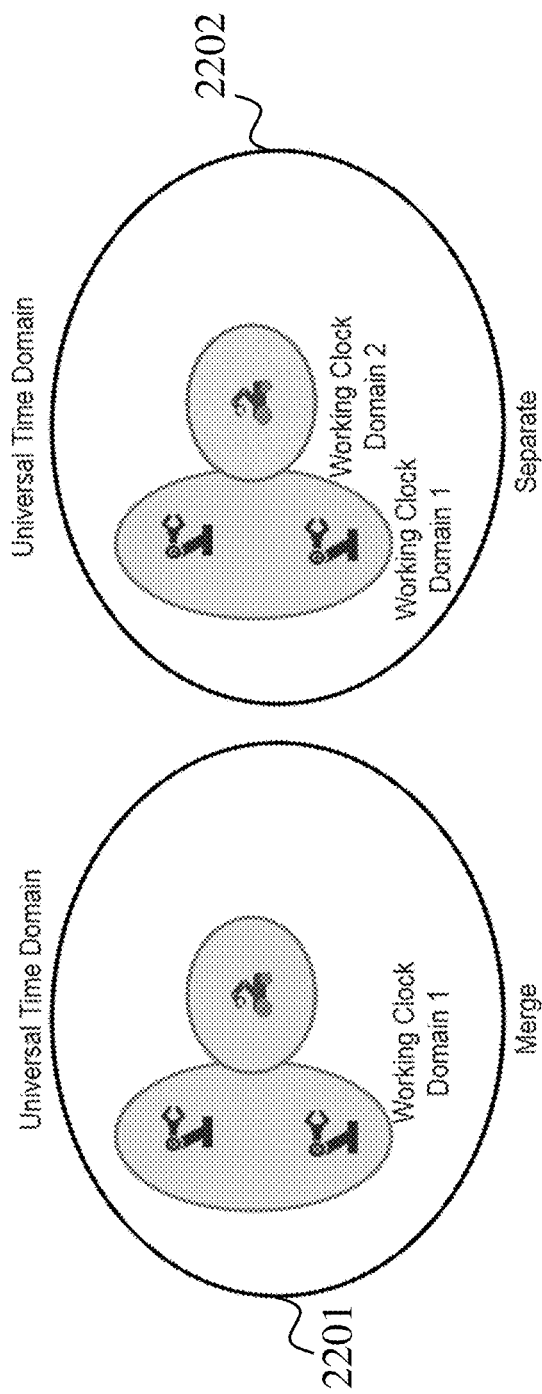
FIG. 22 schematically illustrates working clock domain interactions "Merge" and "Separate", according to the prior art.

FIG. 21 shows a method 2100 according to an embodiment of the invention for a network entity for a wireless network system 1. The method 2100 may be carried out by the device 210, as it is described above.

The method 2100 comprises a step 2101 of obtaining time information 102 from another network entity 200, wherein the time information 102 includes a mapping of an internal time $t_s$ valid at the other network entity 200 and an external time $E_k(t_s)$ valid at a first external network entity 201.

The method 2100 further comprises a step 2102 of synchronizing an internal time $t_s$ valid at the network entity 210 with an external time $E_k(t_s)$ valid at a second external network entity 202, based on the mapping in the time information 102.

The mapping may be, for example, comparing the internal time $t_s$ to the external time $E_k(t)$, wherein k is the clock domain number and measuring the frequency offset $\Delta_k$ between the internal time (i.e., the internal clock) and the external time (i.e., the external clock).

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network entity, comprising:
at least one processor; and
a non-transitory computer-readable medium storing at least one program executable by the at least one processor, the at least one program including instructions to:
obtain time information regarding a received packet from another network entity, wherein the time information includes an ingress time ($t_0$) of the packet, the ingress time ($t_0$) indicating a time at which the packet enters a wireless network system;
obtain, based on the time information, an egress time ($t_1$) of the packet, the egress time ($t_1$) indicating a time at which the packet is to leave the wireless network system, the wireless network system being composed of a core network, a radio access network, and one or more user equipment, and wherein obtaining, based on the time information, the egress time ($t_1$) of the packet comprises determining the egress time ($t_1$) based on the ingress time ($t_0$) included in the time information; and
generate a synchronization message by modifying another synchronization message received from an external network entity according to a residence time ($T\_R\hat{}$) of the packet in the wireless network system.

2. The network entity according to claim 1, wherein the at least one program further includes instructions to determine the residence time ($T\_R\hat{}$) of the packet in the wireless network system based on the ingress time ($t_0$) and the egress time ($t_1$) of the packet.

3. The network entity according to claim 2, wherein the at least one program further includes instructions to provide the synchronization message including information indicative of the residence time ($T\_R\hat{}$) of the packet in the wireless network system to the external network entity.

4. The network entity according to claim 3, wherein the at least one program includes instructions to generate the synchronization message by modifying a correction field of the synchronization message received from the another network entity according to the residence time ($T\_R\hat{}$).

5. The network entity according to claim 1, wherein the at least one program further includes instructions to determine the egress time ($t_1$) of the packet based on the ingress time ($t_0$) and the residence time ($T\_R\hat{}$) of the packet in the wireless network system, and the residence time ($T\_R\hat{}$) of the packet in the wireless network system is predetermined.

6. A network entity, comprising:
at least one processor; and
a non-transitory computer-readable medium storing at least one program executable by the at least one processor, the at least one program including instructions to:
obtain time information regarding a received packet from another network entity;
obtain information indicative of a periodicity of a plurality of packets in a set of packets that enter a wireless network system periodically, wherein the packet belongs to the set of packets; and
obtain, based on the time information and the periodicity, an egress time ($t_1$) of the packet, the egress time ($t_1$) indicating a time at which the packet is to leave the wireless network system, the wireless network system being composed of a core network, a radio access network, and one or more user equipment;
buffer the packet until the egress time ($t_1$) is reached; and
provide the packet to an external network entity at the egress time ($t_1$).

7. The network entity according to claim 6, wherein the at least one program further includes instructions to obtain a predetermined residence time ($T\_R\hat{}$) of the packet in the wireless network system.

8. The network entity according to claim 1, wherein the at least one program further includes instructions to synchronize a time with the another network entity, wherein the another network entity is comprised in the wireless network system.

9. A method, comprising:
obtaining, by a network entity, time information regarding a received packet from another network entity, wherein the time information includes an ingress time ($t_0$) of the packet, the ingress time ($t_0$) indicating a time at which the packet enters a wireless network system;
obtaining, by the network entity based on the time information, an egress time ($t_1$) of the packet, the egress time ($t_1$) indicating a time at which the packet is to leave the wireless network system, the wireless network system being composed of a core network, a radio access network, and one or more user equipment, and wherein obtaining, based on the time information, the egress time ($t_1$) of the packet comprises determining the egress time ($t_1$) based on the ingress time ($t_0$) included in the time information; and
generate a synchronization message by modifying another synchronization message received from an external network entity according to a residence time ($T\_R\hat{}$) of the packet in the wireless network system.

10. The method according to claim 9, further comprising:
determining the residence time ($T\_R\hat{}$) of the packet in the wireless network system based on the ingress time ($t_0$) and the egress time ($t_1$) of the packet.

11. The method according to claim 10, further comprising:
providing the synchronization message including information indicative of the residence time ($T\_R\hat{}$) of the packet in the wireless network system to the external network entity.

12. The method according to claim 11, comprising:
generating the synchronization message by modifying a correction field of the synchronization message received from the another network entity according to the residence time ($T\_R\hat{}$).

13. The method according to claim 9, further comprising:
determining the egress time ($t_1$) of the packet based on the ingress time ($t_0$) and the residence time ($T\_R\hat{}$) of the packet in the wireless network system, and the residence time ($T\_R\hat{}$) of the packet in the wireless network system is predetermined.

14. The method according to claim 9, further comprising:
buffering the packet until the egress time ($t_1$) is reached; and
providing the packet to the external network entity at the egress time ($t_1$).

15. The method according to claim 9, wherein the time information includes the egress time ($t_1$); and
wherein the method further comprises extracting the egress time ($t_1$) from the time information.

16. The method according to claim 15, further comprising:
obtaining the residence time ($T\_R\hat{}$) of the packet in the wireless network system, and the residence time ($T\_R\hat{}$) of the packet in the wireless network system is predetermined.

17. The method according to claim 9, further comprising:
obtaining information indicative of a periodicity of a plurality of packets in a set of packets that enter the wireless network system periodically, wherein the packet belongs to the set of packets; and
determining the egress time ($t_1$) of the packet based on the periodicity.

18. The method according to claim 9, further comprising:
synchronizing a time with the another network entity, wherein the another network entity is comprised in the wireless network system.

19. A non-transitory computer-readable medium storing at least one program executable by at least one processor, the at least one program including instructions to:
obtain time information regarding a received packet from another network entity, wherein the time information includes an ingress time ($t_0$) of the packet, the ingress time ($t_0$) indicating a time at which the packet enters a wireless network system; obtain, based on the time information, an egress time ($t_1$) of the packet, the egress time ($t_1$) indicating a time at which the packet is to leave the wireless network system, the wireless network system being composed of a core network, a radio access network, and one or more user equipment, and wherein obtaining, based on the time information, the egress time ($t_1$) of the packet comprises determining the egress time ($t_1$) based on the ingress time ($t_0$) included in the time information; and
generate a synchronization message by modifying another synchronization message received from an external network entity according to a residence time ($T\_R\hat{\phantom{x}}$) of the packet in the wireless network system.

20. A wireless network system, comprising:
a core network;
a radio access network; and
a user equipment, configured to:
obtain time information regarding a received packet from another network entity, wherein the time information includes an ingress time ($t_0$) of the packet, the ingress time ($t_0$) indicating a time at which the packet enters the wireless network system;
obtain, based on the time information, an egress time ($t_1$) of the packet, the egress time ($t_1$) indicating a time at which the packet is to leave the wireless network system, wherein obtaining, based on the time information, the egress time ($t_1$) of the packet comprises determining the egress time ($t_1$) based on the ingress time ($t_0$) included in the time information; and
generate a synchronization message by modifying another synchronization message received from an external network entity according to a residence time ($T\_R\hat{\phantom{x}}$) of the packet in the wireless network system.

21. The wireless network system according to claim 20, wherein the user equipment is further configured to determine the residence time ($T\_R\hat{\phantom{x}}$) of the packet in the wireless network system based on the ingress time ($t_0$) and the egress time ($t_1$) of the packet.

* * * * *